(12) United States Patent
Ohtaki et al.

(10) Patent No.: US 6,756,157 B2
(45) Date of Patent: Jun. 29, 2004

(54) VOLUME HOLOGRAM LAMINATE AND LABEL FOR PREPARATION OF VOLUME HOLOGRAM LAMINATE

(75) Inventors: Hiroyuki Ohtaki, Shinjuku-Ku (JP); Kenji Ueda, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/288,569

(22) Filed: Apr. 9, 1999

(65) Prior Publication Data

US 2002/0015896 A1 Feb. 7, 2002

(30) Foreign Application Priority Data

| Apr. 9, 1998 | (JP) | 10-097345 |
| Aug. 25, 1998 | (JP) | 10-238614 |
| Oct. 29, 1998 | (JP) | 10-308676 |
| Oct. 29, 1998 | (JP) | 10-308677 |
| Mar. 4, 1999 | (JP) | 11-057168 |

(51) Int. Cl.⁷ .............................. G03H 1/02
(52) U.S. Cl. ............. 430/1; 430/2; 359/3; 359/2; 283/86
(58) Field of Search ............... 490/1, 2; 283/86; 428/40.2; 359/1, 2, 3

(56) References Cited

U.S. PATENT DOCUMENTS

| 4,913,990 A | | 4/1990 | Rallison | 430/1 |
| 5,066,525 A | * | 11/1991 | Nakamachi et al. | 430/2 |
| 5,182,180 A | * | 1/1993 | Gambogi, Jr. et al. | 430/1 |
| 5,282,066 A | * | 1/1994 | Yu et al. | 430/1 |
| 5,413,863 A | * | 5/1995 | Weber et al. | 430/2 |
| 5,500,310 A | * | 3/1996 | King et al. | 430/1 |
| 5,543,271 A | * | 8/1996 | Miwa et al. | 430/945 |
| 5,631,107 A | * | 5/1997 | Tarumi et al. | 430/1 |
| 5,725,970 A | | 3/1998 | Martin et al. | 430/1 |
| 5,843,598 A | * | 12/1998 | Ueda et al. | 430/1 |
| 5,858,614 A | * | 1/1999 | Sato et al. | 430/1 |
| 6,066,378 A | * | 5/2000 | Morii et al. | 428/40.2 |
| 6,075,626 A | * | 6/2000 | Mizutani et al. | 430/1 |

FOREIGN PATENT DOCUMENTS

| CA | 2046711 | * | 1/1992 | 430/1 |
| EP | 0407772 | | 1/1991 | |
| JP | 01-040881 | * | 2/1989 | 430/1 |
| JP | 03-157684 | * | 7/1991 | 430/1 |
| JP | 06-004015 | * | 1/1994 | |
| JP | 06-056484 | * | 3/1994 | 430/1 |
| JP | 06-266271 | * | 9/1994 | 359/3 |
| JP | 09-005526 | * | 1/1997 | 430/1 |
| WO | WO 98/12607 | | 3/1998 | |

OTHER PUBLICATIONS

Schladsman, James A., "Tackfier resins" chapter 16 in "Handbook of Pressure–sensitive adhesive technology" pp. 352–369 (no date).*

* cited by examiner

*Primary Examiner*—Martin Angebranndt
(74) *Attorney, Agent, or Firm*—Parkhurst & Wendel, L.L.P.

(57) ABSTRACT

The present invention provides a volume hologram laminate by which a desirable reproduced wavelength is controlled and set optionally. The laminate has a first adhesive layer 3, a volume hologram layer 5, a second adhesive layer 4 and a surface protecting film 6 formed on a substrate 2 in the described order, wherein a substance for shifting a recorded wavelength to the volume hologram layer is contained in the first and/or the second adhesive layer(s) and a reproduced wavelength of hologram recorded in the volume hologram layer is controlled with shifting the substance between the layers.

17 Claims, 4 Drawing Sheets

VOLUME HOLOGRAM LAMINATE AND LABEL FOR PREPARATION OF VOLUME HOLOGRAM LAMINATE

BACKGROUND OF THE INVENTION

The present invention relates to a volume hologram laminate and a label for preparation of the volume hologram laminate, particularly to a volume hologram laminate and a label for preparation of the volume hologram laminate suitable as a color filter in a mono-color or full-color hologram product or liquid crystalline optical element.

Hitherto, a volume hologram laminate generally has a constitution in which an adhesive layer, a volume hologram layer, an adhesive layer and a transparent protecting layer are laminated in the described order on a substrate. The laminate has been used in applications for protecting a label with a volume hologram layer, i.e. on a substrate such as an identification card, and also has been used as a color filter in a liquid crystalline optical element. There is, however, such a problem that color tones of image information reproduced actually from a hologram are not agreed with recorded color tones. Particularly, it is desirable that a reproduced wavelength being agreed with a recorded wavelength as such as possible for use as a color filter in a full-color hologram product or liquid crystalline optical element.

Further, it is desirable to control and optionally set a reproduced wavelength not only for the case wherein a reproduced wavelength being agreed with a recorded wavelength but also for the case wherein a desirable reproduced wavelength is deviated from a recorded wavelength.

Thus, an object of a first invention is to provide a volume hologram laminate and a label for preparation of a volume hologram laminate in which a desirable reproduced wavelength can be controlled and set optionally.

Further, in the conventional volume holograms, means for making color tones of reproduced image from hologram being agreed with that of a subject to be recorded is required. Particularly, it is desirable that a reproduced wavelength being agreed with a recorded wavelength as much as possible. Furthermore, there may be a case where it is necessary to set an optional color tone suitable for specific purposes or requirements.

Thus, an object of a second invention is to provide a volume hologram laminate and a label for preparation of the volume hologram laminate by which a desirable reproduced wavelength being obtained by controlling the shifted amount of the reproduced wavelength from a recorded wavelength.

Further, in the conventional volume hologram laminate, there is a problem that an illuminating origin to be used for hologram reproducing is limited if a reproduced band-width of diffracted light is narrow when a hologram recorded in a hologram layer is reproduced. As a counterplan for the problem, a reproduced band-width of diffracted light is made wide by arranging a tuning film etc. adjacent to a volume hologram layer. For this method, however, there is a problem that a film thickness of a volume hologram laminate becomes thick.

Thus, an object of a third invention is to provide a volume hologram laminate and a label for preparation of the volume hologram laminate by which a reproduced band of refracting light can be made wide and brilliant hologram can be obtained.

DISCLOSURE OF THE INVENTION

A FIRST INVENTION

A first invention is directed to the following aspects.

A volume hologram laminate according to a first aspect is one having a first adhesive layer, a volume hologram layer, a second adhesive layer and a surface protecting film formed on a substrate in the described order, characterized in that a substance for shifting a recorded wavelength to the volume hologram layer is contained in the first and/or the second adhesive layer(s) and in that a reproduced wavelength of hologram recorded in the volume hologram layer is controlled with shifting the substance between the layers or without shifting.

A volume hologram laminate according to a second aspect is one having a first adhesive layer, a volume hologram layer, a second adhesive layer and a surface protecting film formed on a substrate in the described order, characterized in that a substance for shifting a recorded wavelength to the volume hologram layer is contained in either one of the first and the second adhesive layers, in that the substance is not contained in other adhesive layer, and in that a reproduced wavelength of hologram recording recorded in the volume hologram layer is controlled with shifting the substance between the layers.

A volume hologram laminate according to a third aspect is one having a first adhesive layer, a volume hologram layer, a second adhesive layer and a surface protecting film formed on a substrate in the described order, characterized in that a substance for shifting a recorded wavelength to the volume hologram layer is contained in the first and in that the second adhesive layers and the substance is not shifted from the layers to the volume hologram layer.

A volume hologram laminate according to a fourth aspect is one having a first adhesive layer, a volume hologram layer, a second adhesive layer and a surface protecting film formed on a substrate in the described order, characterized in that a film for shifting a recorded wavelength is put between the first adhesive layer and the volume hologram layer or between the second adhesive layer and the volume hologram layer, in that a substance for shifting a recorded wavelength to the volume hologram layer is contained in one of the adhesive layers without the film, and in that a reproduced wavelength of hologram recorded in the volume hologram layer is controlled with shifting the substance between the respective adhesive layer and the film as well as between the adhesive layer and the volume hologram layer or without shifting.

The above-mentioned adhesive layer is preferably a crosslinking type two component adhesive which is crosslinked at the time of use by addition of a crosslinking agent.

The above-mentioned volume hologram layer comprises preferably a photopolymerizable compound, and the layer is recorded holographically.

The above-mentioned substance for shifting a recorded wavelength comprises preferably at least one compound of a photopolymerizable compound constituting the volume hologram layer, a plasticizer and a surfactant, or a tackifier, and polyalkylene glycol.

A label for preparation of a volume hologram laminate according to a fifth aspect is one having a first adhesive layer, a volume hologram layer, a second adhesive layer and a surface protecting film laminated on a release liner sheet in the described order, characterized in that a substance for shifting a recorded wavelength to the volume hologram layer is contained in the first and/or the second adhesive layer(s) and in that a reproduced wavelength of hologram recorded in the volume hologram layer is controlled with shifting the substance between the layers or without shifting.

A label for preparation of a volume hologram laminate according to a sixth aspect is one having a first adhesive layer, a volume hologram layer, a second adhesive layer and a surface protecting film formed on a release liner sheet in the described order, characterized in that a substance for shifting a recorded wavelength to the volume hologram layer is contained in either one of the first and the second adhesive layers, in that the substance is not contained in other adhesive layer, and in that a reproduced wavelength of hologram recording recorded in the volume hologram layer is controlled with shifting the substance between the layers.

A label for preparation of a volume hologram laminate according to a seventh aspect is one having a first adhesive layer, a volume hologram layer, a second adhesive layer and a surface protecting film formed on a release liner sheet in the described order, characterized in that a substance for shifting a recorded wavelength to the volume hologram layer is contained in the first and the second adhesive layers and in that the substance is not shifted from the layers to the volume hologram layer.

A label for preparation of a volume hologram laminate according to an eighth aspect is one having a first adhesive layer, a volume hologram layer, a second adhesive layer and a surface protecting film formed on a release liner sheet in the described order, characterized in that a film for shifting a recorded wavelength is put between the first adhesive layer and the volume hologram layer or between the second adhesive layer and the volume hologram layer, in that a substance for shifting a recorded wavelength to the volume hologram layer is contained in one of the adhesive layers without the film, and in that a reproduced wavelength of hologram recorded in the volume hologram layer is controlled with shifting the substance between the respective adhesive layer and the film as well as between the adhesive layer and the volume hologram layer or without shifting.

A SECOND INVENTION

A first volume hologram laminate according to the invention is one having a first adhesive layer, a volume hologram layer, a second adhesive layer and a surface protecting film formed on a substrate in the described order, characterized in that a substance with a refractive index lower than that of the volume hologram layer for shifting a recorded wavelength is contained in the first and/or the second adhesive layer(s) and in that a reproduced wavelength of hologram recorded in the volume hologram layer is shifted to a short wavelength side.

A refractive index of the above-mentioned substance for shifting a recorded wavelength is preferably at least 0.1 at 25° C. lower than that of the volume hologram layer.

The above-mentioned substance for shifting a recorded wavelength is preferably at least one of silicone type compounds and fluorine type compounds.

A second volume hologram laminate according to the invention is one having a first adhesive layer, a volume hologram layer, a second adhesive layer and a surface protecting film formed on a substrate in the described order, characterized in that a substance with a refractive index higher than that of the volume hologram layer for shifting a recorded wavelength is contained in the first and/or the second adhesive layer(s) and in that a reproduced wavelength of hologram recorded in the volume hologram layer is shifted to a long wavelength side.

A refractive index of the substance for shifting a recorded wavelength in the second volume hologram laminate according to the invention is preferably at least 0.06 at 25° C. higher than that of the volume hologram layer.

The substance for shifting a recorded wave length in the second volume hologram laminate according to the invention is preferably at least one of aromatic compounds, rosin type tackifiers, terpene type tackifiers and synthetic resin type tackifiers.

The above-mentioned adhesive layer is preferably formed of a crosslinking type two component adhesive which is crosslinked at the time of use by addition of a crosslinking agent.

The above-mentioned volume hologram layer comprises preferably a photopolymerizable compound, and the layer is recorded holographically.

A first label for preparation of a volume hologram laminate according to the invention is one having a first adhesive layer, a volume hologram layer, a second adhesive layer and a surface protecting film formed on a release liner sheet in the described order, characterized in that a substance with a refractive index lower than that of the volume hologram layer for shifting a recorded wavelength is contained in the first and/or the second adhesive layer(s) and in that a reproduced wavelength of hologram recorded in the volume hologram layer is shifted to a short wavelength side.

A second label for preparation of a volume hologram laminate according to the invention is one having a first adhesive layer, a volume hologram layer, a second adhesive layer and a surface protecting film laminated on a release liner sheet in the described order, characterized in that a substance with a refractive index higher than that of the volume hologram layer for shifting a recorded wavelength is contained in the first and/or the second adhesive layer(s) and in that a reproduced wavelength of hologram recorded in the volume hologram layer is shifted to a long wavelength side.

A THIRD INVENTION

A volume hologram laminate according to a third invention is one having a first adhesive layer, a volume hologram layer, a second adhesive layer and a surface protecting film formed on a substrate in the described order, characterized in that a (meth) acrylic monomer is contained in the first and/or the second adhesive layer(s), in that the volume hologram layer is recorded holographically with light having a single wavelength (monochromatic hologram), and a half band-width value of a respective reproduced wavelength range is 30 nm or more.

Further, a volume hologram laminate according to the invention is one having a first adhesive layer, a volume hologram layer, a second adhesive layer and a surface protecting film formed on a substrate in the described order, characterized in that a (meth)acrylic monomer is contained in the first and/or the second adhesive layer(s), in that the volume hologram layer is color-recorded holographically with light having two or more wavelengths, and a half width value of a respective reproduced wavelength range is 20 nm or more.

The above-mentioned adhesive layer is preferably a crosslinking type two component adhesive which is crosslinked at the time of use by addition of a crosslinking agent.

The above-mentioned volume hologram layer comprises preferably a photopolymerizable compound, and the layer is recorded holographically.

A label for preparation of a volume hologram laminate according to the invention is one having a first adhesive layer, a volume hologram layer, a second adhesive layer and a surface protecting film formed on a release liner sheet in the described order, characterized in that a (meth)acrylic monomer is contained in the first and/or the second adhesive layer(s) and in that a half width value of respective reproduced wavelength range is 30 nm or more and in that a volume hologram layer is recorded holographically with light having a single wavelength.

Further, a label for preparation of a volume hologram laminate according to the invention is one having a first adhesive layer, a volume hologram layer, a second adhesive layer and a surface protecting film formed on a release liner sheet in the described order, characterized in that a (meth) acrylic monomer is contained in the first and/or the second adhesive layer(s), in that a volume hologram layer is color-recorded holographically with light having two or more wavelengths, and in that a half width value of a respective reproduced wavelength range is 20 nm or more.

DETAILED DESCRIPTION OF THE INVENTION

A FIRST INVENTION

Figure 1:
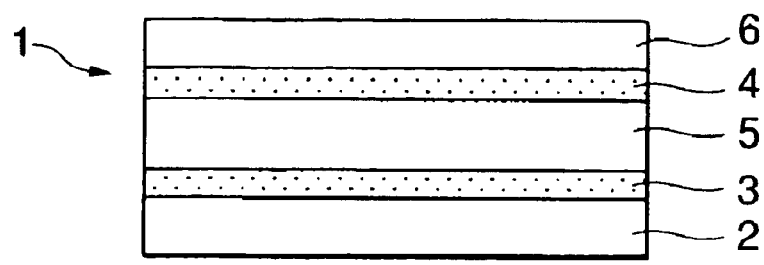
FIG. 1, FIG. 2, FIG. 8 and FIG. 10 are cross-sectional views of volume hologram laminates according to the invention.
Figure 2:
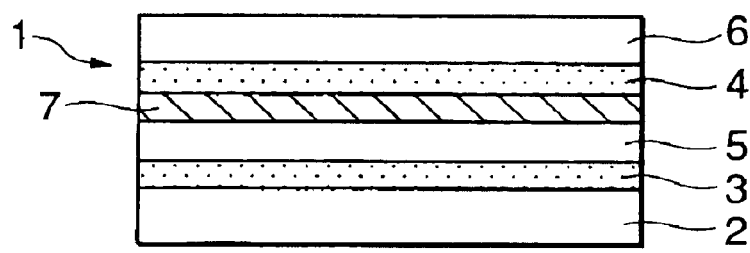

Volume hologram laminates according to the first to the third aspects of the first invention are shown in FIG. 1 by means of cross-sectional views. In the drawings, reference numeral 1 denotes a volume hologram laminate, reference numeral 2 denotes a substrate, reference numeral 3 denotes a first adhesive layer, reference numeral 4 denotes a second adhesive layer, reference numeral 5 denotes a volume hologram layer, and reference numeral 6 denotes a surface protecting film. Further, a volume hologram laminate according to the fourth aspect of the first invention is shown in FIG. 2 by means of a cross-sectional view. In the drawing, reference numeral 7 denotes a film for shifting recorded wavelength and other identical numerals denote same meanings as in FIG. 1.

As the substrate 2 in the volume hologram laminate according to the first to the fourth aspects, a film or a sheet comprising paper, synthetic paper, synthetic resin or metal can be used. The substrate can be shaped in various forms, for example, sheets such as a certificate for examination, cards such as an ID card, or pamphlets such as a passport. It is used as a substrate for attaching a volume hologram body in which a face picture or a landscape is recorded holographically in a mono-color or full-color mode. Further, in the case for a color filter of a liquid crystalline display element, a glass substrate or an electrode layer in a liquid crystalline cell may be a substrate.

Further, volume hologram laminates according to the first to the fourth aspects are shown in FIG. 1 and FIG. 2 as a constitution in which a volume hologram layer 5 is formed on a substrate 2 via an adhesive layer 3. It may take, however, such a constitution that a volume hologram layer 5 is laminated on a substrate 2 via a both-side adhesive tape.

The volume hologram layer 5 is prepared by coating a volume hologram recording material on a supporting film and thereafter recording interference stripes corresponding to a wave front of light from an object to be recorded in a form of transparency modulation or refractive index modulation. For replication, it can be prepared easily by adhering a volume hologram original plate closely, exposing and developing.

The volume hologram layer 5 is a photosensitive material for dry volume phase type hologram recording which comprises a matrix polymer, a photopolymerizable compound, a photopolymerization initiator, a sensitizing pigment, and if necessary a plasticizer and a surfactant.

As photopolymerizable compounds, there may be mentioned photopolymerizable or photocrosslinkable monomers, oligomers and prepolymers having at least one ethylenic unsaturated bonding in a molecule structure described below and their mixtures. As specific examples thereof, for example, unsaturated carboxylic acids and their salts, esters of unsaturated carboxylic acids and aliphatic polyvalent alcohol compounds, as well as amide-bonded compounds of unsaturated carboxylic acids and aliphatic polyvalent amine compounds may be mentioned.

As concrete examples of unsaturated carboxylic acid monomers, there may be mentioned acrylic acid, methacrylic acid, itaconic acid, crotonic acid, isocrotonic acid, maleic acid, and their halogen-substituted unsaturated carboxylic acids, such as chlorinated unsaturated carboxylic acids, brominated unsaturated carboxylic acids and fluorinated unsaturated carboxylic acids. As salts of unsaturated carboxylic acids, there may be mentioned sodium salts and potassium salts of the above-mentioned acids.

Further, as concrete examples of ester monomers of aliphatic polyvalent alcohol compounds and unsaturated carboxylic acids, the following compounds may be mentioned: as esters of acrylic acid, ethylene glycol diacrylate, triethylene glycol diacrylate, 1,3-butandiol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol, tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylateoligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl)ether of bisphenol A, diacrylate of ethoxylated bisphenol A, 2-(1-naphthyloxy)ethyl acrylate, o-biphenyl methacrylate and o-biphenyl acrylate etc.

As esters of methacrylic acid, there may be mentioned tetramehylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]dimethylmethane, bis-[p-(acryloxyethoxyphenyl)dimethylmethane, 2,2-bis(4-methacryloyloxyphenyl) propane, and 2-naphthyl methacrylate etc.

As esters of itaconic acid, there may be mentioned ethylene glycol diitaconate, propylene glycol diitaconate, 1,3-butanediol diitaconate, 1,4-butanediol diitaconate, tetramethylene glycol diitaconate, pentaerythritol diitaconate and sorbitol tetraitaconate etc.

As esters of crotonic acid, there may be mentioned ethylene glycol dicrotonate, tetramethylene glycol dicrotonate, pentaerythritol dicrotonate and sorbitol tetracrotonate etc. As esters of isocrotonic acid, there may be mentioned ethylene glycol diisocrotonate, pentaerythritol diisocrotonate and sorbitol tetraisocrotonate etc.

As esters of maleic acid, there may be mentioned ethylene glycol dimaleate, triethylene glycol dimaleate, pentaerythritol dimaleate and sorbitol tetramaleate etc.

As halogenated unsaturated carboxylic acids, there may be mentioned 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (tradename: NK ESTER DBN; made by Shin Nakamura Kagaku Kogyo Co. Ltd.), dibromopropyl acrylate (tradename: NK ESTER A-DBP; made by Shin Nakamura Kagaku Kogyo Co. Ltd.), dibromopropyl methacrylate (tradename: NK ESTER DBP; made by Shin Nakamura Kagaku Kogyo Co. Ltd.), chloride methacrylate, 2,4,6-trichlorophenyl methacrylate, p-chlorostyrene, methyl-2-chloroacrylate, ethyl-2-chloroacrylate, n-butyl-2-chloroacrylate, tribromophenol acrylate and tetrabromophenol acrylate etc.

Further, as concrete examples of amido monomers of unsaturated carboxylic acids and aliphatic polyvalent amine compounds, there may be mentioned methylenebisacrylamide, methylenebismethacrylamide, 1,6-hexamethylenebisacrylamide, 1,6-hexamethylenebismethacrylamide, diethylenetriaminetrisacrylamide, xylylenebisacrylamide, xylylenebismethacrylamide, N-phenylmethacrylamide and diacetoneacrylamide etc.

As other examples, there may be mentioned polyisocyanate compounds having two or more isocyanate groups in one molecular described in Japanese Patent Publication No. Sho 48-41708, and vinyl urethane compounds containing two or more polymerizable vinyl groups in which vinyl monomer containing hydroxyl group expressed by the following formula $CH_2=C(R)COOCH_2CH(R')OH$, wherein R and R' denote hydrogen or methyl group, being added.

Further, there may be mentioned urethane acrylates described in Japanese Patent Laid-Open Publication No. Sho 51-37193, polyester acrylates, polyfunctional acrylates and methacrylates of epoxy resins and (math) acrylic acid etc. described in Japanese Patent Laid-Open Publication No. Sho 48-64183, Japanese Patent Publication No. Sho 49-43191 and Japanese Patent Publication No. Sho 52-30490, respectively.

Further, those disclosed in Japan Adhesive Association Journal Vol.20, No.7, pages 300–308 as photocurable monomers and oligomers may be used.

Additionally, as monomers containing phosphorus, there may be mentioned mono(2-acryloyloxyethyl)acid phosphate (tradename: LIGHTESTER PA, made by Kyoeisha Yushi Kagaku Kogyo Co. Ltd.), mono(2-methacryloyloxyethyl) acid phosphate (tradename: LIGHTESTER PM, made by Kyoeisha Yushi Kagaku Kogyo Co. Ltd.) as well as epoxyacrylate types such as tradename: RIPOXY VR-60 (made by Showa Kobunshi Co. Ltd.) and tradename: RIPOXY VR-90 (made by Showa Kobunshi Co. Ltd.).

Further, there are also mentioned tradename: NK ESTER M-230G (made by Shin Nakamura Kagaku Kogyo Co. Ltd.) and tradename: NK ESTER 23G (made by Shin Nakamura Kagaku Kogyo Co. Ltd.).

Further, there may be mentioned triacrylates having the following structural formulae:

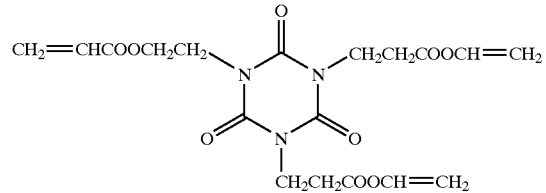

(made by Toa Gosei Kagaku Kogyo Co. Ltd.; tradename: ARONIX M-315),

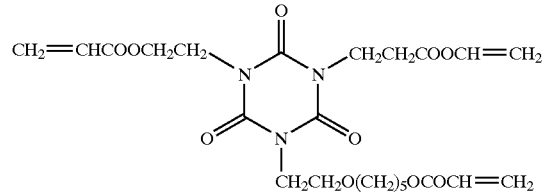

(made by Toa Gosei Kagaku Kogyo Co. Ltd.; tradename: ARONIX M-325), as well as 2,2'-bis(4-acryloxydiethoxyphenyl)propane (made by Shin Nakamura Kagaku Kogyo Co. Ltd.; tradename: NK ESTER A-BPE-4) and tetramethylolmethane tetraacrylate (made by Shinnakamura Kagaku Kogyo Co. Ltd.; tradename: NK ESTER A-TMMT) etc.

Further, as plasticizers to be added if necessary, there may be mentioned polyvalent alcohols such as ethylene glycol, diethylene glycol, triethylene glycol, tetraethylene glycol, glycerol and trimethylolpropane; their derivatives in which terminal hydroxyl group being blocked by etherification or acetylation; polyalkylene glycols such as polyethylene glycols having a weight average molecular weight of 200–2,000, preferably 200–600 and polypropylene glycols having a weight average molecular weight of 300–2,000, preferably 300–1,000; polyester type plasticizers, for example, phthalate type plasticizers such as dimethyl phthalate (DMP), diethyl phathalate (DEP), dibutyl phthalate (DBP), heptylnonyl phthalate (HNP), di-2-ethylhexyl phthalate (DOP), di-n-octyl phthalate (DNOP), di-i-octyl phthalate (DCapP), phthalic acid (79alkyl)(D79P), di-i-decyl phthalate (DIDP), ditridecyl phthalate (DTDP), dicyclohexyl phthalate (DCHP), butylbenzyl phthalate (BDP), ethylphthalylethyl glycolate (EPEG), butylphthalylbutyl glycolate (BPBG); aliphatic dibasic acid ester type plasticizers such as di-2-ethylhexyl adipate (DOA), di-(methylcyclohexyl) adipate, diisodecyl adipate (DIDA), di-n-hexyl azelate (DNHZ), di-2-ethylhexyl azalate (DOZ), dibutyl sebacate (DBS), di-2-ethylhexyl sebacate(DOS); citrate type plasticizers such as triethyl citrate (TEC), tributyl citrate (TBC), triethyl acetylcitrate (ATEC), tributyl acetylcitrate (ATBC); epoxy type plasticizers such as epoxidized soy oil; as well as phosphate type plasticizers such as tributyl phosphate (TBP), triphenyl phosphate (TPP), tricresyl phosphate (TCP) and tripropylene glycol phosphate.

Then, as photopolymerization initiators belonging to initiators systems, there may be exemplified 1,3-di(t-butyldioxylcarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isoxazolone, 2-mercaptobenzimidazole and imidazole dimers etc. It is preferable that the photopolymerization initiator is decomposed after hologram recording from the viewpoint of stabilization of the recorded hologram. For example, organic peroxide type initiators are preferable since they can be decomposed easily by ultraviolet irradiation.

As sensitizing pigments (dyes), there may be exemplified thiopyrylium salt type pigments, merocyanine type pigments, quinoline type pigments, styrylquinoline type pigments, ketocoumarine type pigments, thioxanthene type pigments, xanthene type pigments, oxonol type pigments, cyanine dyestuffs, rhodamine dystuffs, thiopyrylium salt type pigments, pyrylium ion type pigments and diphenyl iodonium ion type pigments etc, which have absorption spectra in a wavelength range of 350–600 nm. Also, sensitizing pigments having absorption spectra in a wavelength range of below 350 nm or above 600 nm may be used.

As matrix polymers, there may be mentioned polymethacrylates or their partial hydrolysates, polyvinyl acetate or its hydrolysates, polyvinyl alcohol or its partial acetylated compounds, triacetyl cellulose, polyisoprene, polybutadiene, polychloroprene, silicone rubber, polystyrene, polyvinyl butyral, polychloroprene, polyvinyl chloride, chlorinated polyethylene, chlorinated polypropylene, poly-N-vinylcarbazole or its derivatives, poly-N-vinylpyrrolidone or its derivatives, copolymer of styrene and maleic anhydride or its half esters, copolymers containing at least one of copolymerizable monomers such as acrylic acid, acrylate, methacrylic acid, methacrylate, acrylamide, acrylonitrile, ethylene, propylene, vinyl chloride and vinyl acetate as a polymerization component, or their mixtures. Preferably, there may be mentioned polyisoprene, polybutadiene, polychloroprene, polyvinyl alcohol, polyvinyl acetal which is a partially acetylated compound of polyvinyl alcohol, polyvinyl butyral, polyvinyl acetate, ethylene-vinyl acetate copolymer, vinyl chloride-vinyl acetate copolymer and their mixtures.

As a stabilizing step for recorded hologram, there may be a monomer shifting step by means of heating. For it, it is necessary that the matrix polymer has preferably a relatively low glass transition temperature for easy monomer shifting.

The photopolymerizable compound (dye) is used in a proportion of 10–1,000 parts by weight, preferably 10–100 parts by weight, to 100 parts by weight of a binder resin.

The photopolymerization initiator is used in a proportion of 1–10 parts by weight, preferably 5–10 parts by weight, to 100 parts by weight of a binder resin.

The sensitizing pigment is used in a proportion of 0.01–1 parts by weight, preferably 0.01–0.5 parts by weight, to 100 parts by weight of a binder resin.

Further, as photosensitive material components, there may be mentioned various non-ionic surfactants, cationic surfactants and anionic surfactants.

The hologram recording material is made into a coating solution with a solid content of 15%–25% by using acetone, methylethylketone, methylisobutylketone, cyclohexanone, benzene, toluene, xylene, chlorobenzene, tetrahydrofurane, methylcellosolve, ethylcellosolve, methylcellosolve acetate, ethyl cellosolve acetate, ethyl acetate, 1,4-dioxane, 1,2-dichloroethane, dichloromethane, chloroform, methanol, ethanol or isopropanol, or their mixtures. A thickness of the hologram recording layer is 0.1 $\mu$m–50 $\mu$m, preferably 5 $\mu$m–20 $\mu$m.

As such hologram materials, there may be mentioned OMNIDEX 352 and 706 made by DuPont Co. Ltd.

Then, adhesive layers 3 and 4 are explained. As adhesive layers, there may be mentioned acrylic resins, acrylate resins, or their copolymers, styrene-butadiene copolymers, natural rubbers, casein, gelatin, rosin esters, terpene resins, phenol type resins, styrene type resins, chromaneindene resins, polyvinyl ethers, silicone resins, as well as alpha-cyanoacrylate type, silicone type, maleimide type, styrol type, polyolefin type, resorcinol type, polyvinyl ether type and silicone type adhesives. Further, the adhesive layers may be formed by using so-called crosslinking type two component adhesives which are crosslinked by addition of isocyanate type crosslinking agents or metallic chelate type crosslinking agents etc. at the time of use. Further, as adhesive layers, there may be used heat-sealing agents, for example, ethylene-vinyl acetate copolymerized resins, polyamide resins, polyester resins, polyethylene resins, ethylene-isobutyl acrylate copolymerized resins, butyral resins, polyvinyl acetate and its copolymerized resins, cellulose derivatives, polymethyl methacrylate resins, polyvinyl ether resins, polyurethane resins, polycarbonate resins, polypropylene resins, epoxy resins, phenol resins, thermoplastic elastomers such as SBS, SIS, SEBS and SEPS, and reactive hot-melt type resins etc. A thickness of the adhesive layer may be 4 $\mu$m–20 $\mu$m.

In volume hologram, color tones of image information reproduced actually from hologram start to change from color tones recorded holographically with the lapse of time. As to causes thereof, it is considered that a substance which will swell a volume hologram layer and change hologram record may be bled or penetrated from an adjacent adhesive layer. Thus, hologram record may be shifted to a long wavelength side by swelling of the volume hologram layer. Further, in the case that the adjacent adhesive layer does not contain a substance to change hologram record, a transfer component contained in the volume hologram layer is shifted inversely into the adjacent adhesive layer. As the result, the volume hologram layer is contracted to shift the record to a short wavelength side. Further, for the volume hologram layer containing a shifting component, the component may be decreased as such by removal from the volume hologram layer with lapse of time; thus its reproduced wavelength is shifted to a short wavelength side.

Therefore, in the volume hologram laminate according to the first aspect, a substance for shifting a recorded wavelength similar to the shifting component contained in the volume hologram layer is also contained previously in the adhesive layer. Thus, a reproduced wavelength having few difference from the recorded wavelength can be obtained by suppressing change of the shifting component in the volume hologram layer. Further, the reproduced wavelength can be controlled to a desirable reproduced wavelength by adjusting a content of the shifting component in the adhesive layer.

Further, in the volume hologram laminate according to the second aspect, a substance for shifting recorded wavelength is contained in either one of the first adhesive layer and the second adhesive layer and any substance for shifting recorded wavelength is not contained in other adhesive layer. The latter layer is to receive a shifted component from the volume hologram layer. Thus, a reproduced wavelength having few differences from the recorded wavelength can be obtained by suppressing change of the shifting component in the volume hologram layer. Further, the reproduced wavelength can be controlled to the desirable reproduced wavelength by adjusting a content of a shifting component in the adhesive layer.

Further, in the volume hologram laminate according to the third aspect, contents of transfer components are balanced in the first adhesive layer, the second adhesive layer and the volume hologram layer in order not to produce shifting. Thus, a reproduced wavelength having few differences from the recorded wavelength can be obtained.

Further, in the volume hologram laminate according to the fourth aspect, a film for shifting recorded wavelength is contained between the first adhesive layer and the volume hologram layer or between the second adhesive layer and the volume hologram layer, and a substance for shifting recorded wavelength for the volume hologram layer is contained in the adhesive layer without the film. Thus, a reproduced wavelength having few differences from the recorded wavelength can be obtained by suppressing shifting between the adhesive layers, the film and the volume hologram layer, respectively. Further, the reproduced wavelength can be controlled to a desirable reproduced wavelength by adjusting a content of the shifting component in the adhesive layer.

In other words, according to the first invention, not only the difference between the recorded wavelength and the reproduced wavelength is decreased but also the reproduced wavelength can be controlled by adjusting an amount of the photopolymerizable compound or the plasticizer to be added in the adhesive layer.

Then, the substance for shifting the recorded wavelength in the adhesive layer and the film for shifting the recorded wavelength are explained as follows. In the present invention, as the shifting component, i.e. the substance for shifting the recorded wavelength in the adhesive layer, there may be mentioned those photopolymerizable compounds and plasticizers described above for the constituting materials in the volume hologram layer. These shifting components may be, however, the same as or different from the constituting materials in the volume hologram layer. Further, as the shifting components, there may be also mentioned tackifiers, surfactants and polyalkylene glycol etc.

As tackifiers, there may be exemplified rosin type tackifiers such as gum rosins, tall oil rosins, wood rosins, hydrogenated rosins, esterified rosins, dimerized rosins, limed rosins; terpene type tackifires such as terpene resins including cyclic terpenes such as α-pinene, β-pinene camphor and dipentene, terpene phenol resins and aromatic modified terpenes; as well as synthetic resin type tackifiers, for example, those having 5 carbon atoms obtained by polymerization of petroleum fractions such as synthetic resin type tackifiers mainly comprising isoprene, cyclopentadiene, 1,3-pentadiene 1-pentene copolymers, 2-pentene, dicyclopentadiene copolymer and 1,3-pentadiene, those having 9 carbon atoms obtained by polymerization of petroleum fractions having 6–11 carbon atoms such as synthetic resin type tackifiers of indene, styrene, methylindene, α-methylstyrene copolymers.

Further, as the surfactants added to the adhesive layer, there may be exemplified primary amine salts, secondary amine salts, tertiary amine salts and quarternary amine salts as cationic surfactants; carboxylates, sulfates, sulfonates and phosphates as anionic surfactants, amino acid type amphoteric surfactants and betaine amphoteric surfactants as amphoteric surfactants as well as non-ionic surfactants.

Further, as polyalkylene glycols, there may be exemplified polyethylene glycol, polypropylene glycol, etc.

As the shifting component, i.e. the substance for shifting recorded wavelength, contained in the adhesive layer, those having a low molecular weight of 100–5,000, particularly 100–2,000, are preferably used. If the molecular weight is lower than 100, those may become volatile which is not preferable. Also, if the molecular weight is higher than 5,000, the shifting property to the adjacent layer is decreased and the object for addition may not be attained.

Further, as the substance for shifting recorded wavelength contained in the adhesive layer, it is preferable to select a substance having compatibility with the constituting components of the volume hologram layer. Also, the substance is required not to shift and destroy completely the recorded interference stripes or not to make reproduction of recording impossible. In addition, the shifting component, i.e. the substance for shifting recorded wavelength, contained in the adhesive layer may be contained in the adhesive layer in an amount not to lose its tackifying property, such as 20% by weight or less. However, its content is appropriately set depending on the relationship with an amount of the shifting component in the volume hologram layer and on the relationship with desirable reproduced wavelength.

The relationships between the content of the substance for shifting recorded wavelength in the adhesive layer and reproduced wavelength in the volume hologram layer may be determined by the following experimental methods.
(Dependency of a Shifted Wavelength Amount on an Added Amount of a Photopolymerizable Compound)

A hologram recording film: a PET film/a volume hologram layer/a polyvinyl chloride film (made by DuPont Co. Ltd.; Omnidex 706)

An adhesive film: the following composition

Adhesives having various trimethylolpropane triacrylate (TMPTA) concentrations were prepared by adding varied amounts of TMPTA on the following composition:

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight. |

The adhesives were coated on PET films at a dry film thickness of 15 µm, to prepare respective adhesive films.

At first, recording was carried out holographically on the hologram recording film by means of an argon laser having a specified wavelength of 488 nm. Thereafter, polyvinyl chloride film thereof was delaminated and the adhesive film was adhered on the hologram surface from the adhesive layer side.

The obtained PET film/the volume hologram layer/the adhesive layer/the PET film laminates were baked at 140° C. for 15 minutes, which is the conditions in the actual processing procedure. Thereafter, spectral transparency was measured by using UV-2100PC made by Shimazu Seisakusho. A peak wavelength was determined and then a shifted amount from the recorded wavelength of 488 nm (peak wavelength−488 nm=Δλ) was calculated.

Figure 3:
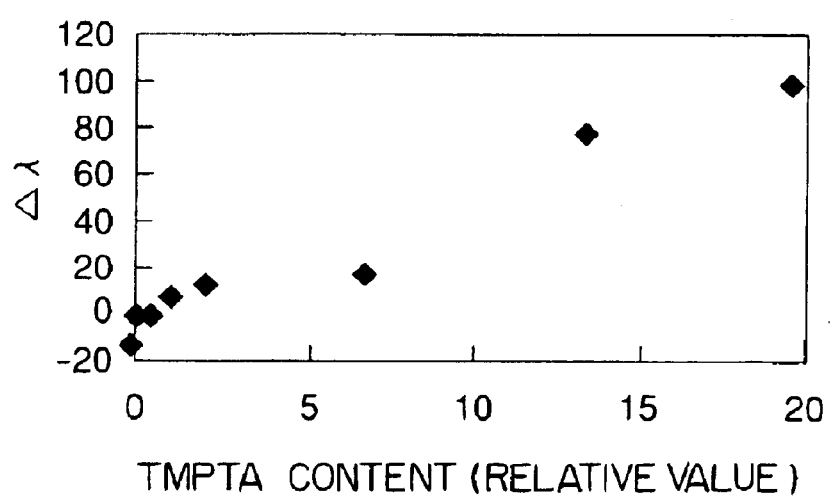
FIG. 3 and FIG. 11 are drawings explaining relationships between an added amount of trimethylolpropane triacrylate in an adhesive layer and a shifted amount of a wavelength from a recorded wavelength in an obtained volume hologram layer.

The measured results are shown in FIG. 3 in which the concentration of TMPTA in a relative value is shown. The unit thereof is expressed in $10^{-4}$ mol and an added amount per 1 g of an acrylic adhesive. As shown in FIG. 3, for the case in which the added amount of TMPTA in the adhesive layer being 0, Δλ is negative. Therefore, it is seen that unreacted monomers and plasticizers etc. were shifted from the volume hologram layer to the adhesive layer and the volume hologram layer was contracted to shift the reproduced wavelength to a short wavelength side. Further, if the added amount of TMPTA being increased, Δλ is increased to shift the reproduced wavelength to a long wavelength side.

(Dependency of a Shifted Wavelength Amount on an Added Amount of a Polyethylene Glycol (PEG) and on an Molecular Weight of a PEG.)

A hologram recording film: a PET film/a volume hologram layer/a polyvinyl chloride film (made by DuPont Co. Ltd.; Omnidex 706)

An adhesive film: the following composition

Adhesives were prepared by adding PEG having various molecular weights in an amount of $2\times10^{-4}$ mole (black rhombic shape) or $7\times10^{-4}$ mole (black square shape) to 1 g of an acrylic adhesive of the following composition:

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight. |

The adhesives were coated on PET films at a dry film thickness of 15 μm, to prepare respective adhesive films.

At first, recording was carried out holographically on the hologram recording film by means of argon laser having a specified wavelength of 488 nm. Thereafter, its polyvinyl chloride film thereof was delaminated and the adhesive film was adhered on the hologram surface from the adhesive layer side.

The obtained PET film/the volume hologram layer/the adhesive layer/the PET film laminates were baked at 140° C. for 15 minutes which were the conditions in the actual processing procedure. Thereafter, spectral transparency was measured by using UV-2100PC made by Shimazu Seisakusho. A peak wavelength was determined and then a shifted amount from the recorded wavelength of 488 nm (peak wavelength−488 nm=Δλ) was calculated.

Figure 4:
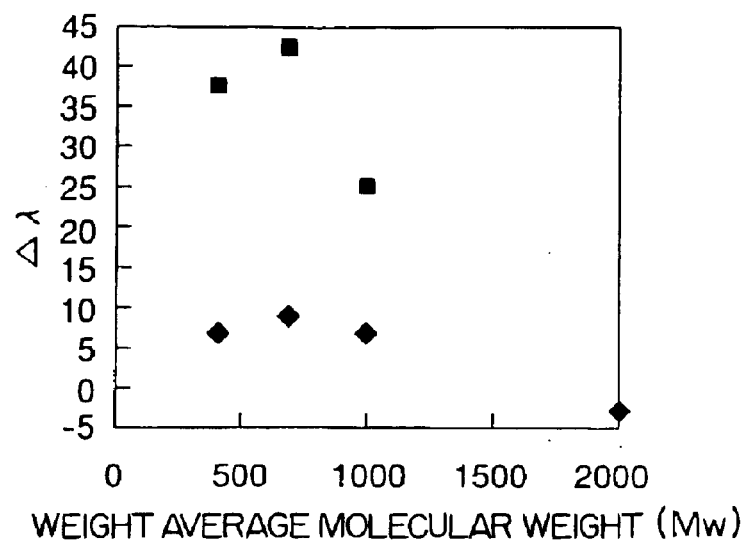
FIG. 4 is a drawing explaining a relationship between an added amount of various polyethylene glycols having different molecular weights in an adhesive layer and a shifted amount of a wavelength from a recorded wavelength in an obtained volume hologram layer.

The measured results are shown in FIG. 4. As shown in FIG. 4, if the molecular weight of PEG is increased or if the added amount thereof is increased, Δλ is increased and the reproduced wavelength was shifted to a short wavelength side.

(Dependency of a Shifted Wavelength Amount on an Added Amount of a Polypropylene Glycol (PPG))

Figure 5:
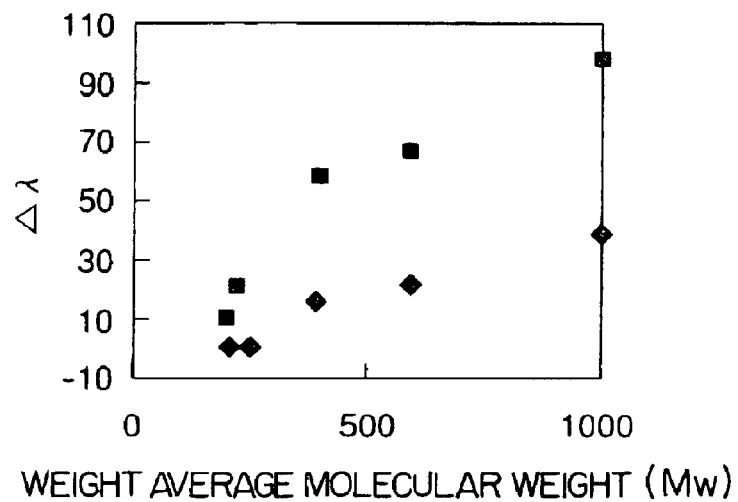
FIG. 5 is a drawing explaining a relationship between an added amount of various polypropylene glycols having different molecular weights in an adhesive layer and a shifted amount of a wavelength from a recorded wavelength in an obtained volume hologram layer.

A shifted wavelength amount was measured by substituting PEG with PPG similar to the above-mentioned experiment for an added amount dependency of PEG. The measured results are shown in FIG. 5. As shown in FIG. 5, PPG showed similar effects to PEG, but it is seen that the wavelength was shifted most by PPG having a molecular weight of about 700–1,000.

(Example for Measurement of Commercially Available Adhesive Films)

A hologram recording film: a PET film/a volume hologram layer/a polyvinyl chloride film (made by DuPont Co. Ltd.; Omnidex 706)

Adhesive film: the commercially available film shown in Table 1.

Similar to the above-mentioned way, an adhesive layer was laminated on the hologram recording film and baked at 140° C. for 15 minutes. Thereafter, spectral transparency was measured. A peak wavelength was determined and then a shifted amount from the recorded wavelength of 488 nm (peak wavelength −488 nm=Δλ) was calculated. The measured results are shown in Table 1.

In Table 1, the measured results about peak wavelength of spectral transparency immediately after laminating the adhesive layer on the hologram recording film are shown together. Further, the results of those tested on the hologram recording film without any adhesive film are shown together as "no" in the commercially available column. Units of wavelength in the Table are expressed in nm.

TABLE 1

| Commercially Available Adhesive Film | Peak Wavelength after baking | Δλ | Peak Wavelength immediately after laminating |
|---|---|---|---|
| Lintec "PL Sin" | 474.5 | −13.5 | 480 |
| Lintec "PN 15G" | 470.5 | −17.5 | 479 |
| Poratechno "AD 20" | 463.5 | −24.5 | 479 |
| Nippon Carbide "PE 118" | 470.5 | −17.5 | 479.5 |
| Nippon Carbide "crosslinked PE 118" | 470.5 | −17.5 | 479.5 |
| Nitto Denkosha "MC 2000" | 459.5 | −28.5 | 479.5 |
| Nitto Denkosha "MC 2030" | 469 | −19 | 479.5 |
| Nitto Denkosha "MC 2070" | 500 | +12 | 479.5 |
| no | 480 | −8 | 478.5 |

From the Table, it is seen that the wavelength was shifted to a short wavelength side after baking even for the hologram recording film alone.

In the present invention, the difference between the recorded wavelength and the reproduced wavelength can be decreased and also the reproduced wavelength can be controlled to the desirable wavelength by combining the hologram recording film and the adhesive film appropriately based on these measured data.

The volume hologram laminate according to the fourth aspect has a film 7 for shifting recorded wavelength between the second adhesive layer 4 and the volume hologram layer 5 as shown in FIG. 2. The film 7 for shifting recorded wavelength may be arranged between the volume hologram layer 5 and the first adhesive layer 3.

The film 7 for shifting recorded wavelength is formed without any ingredients such as a photopolymerizing initiator or a sensitizing agent etc. and contains a shifting component such as a photopolymerizable compound, a plasticizer and surface lubricant etc. similar to the volume hologram layer. As the film for shifting recorded wavelength, commercially available ones such as "OMNIDEX CTF films" made by DuPont Co. Ltd. may be exemplified. When the film is laminated on the hologram layer with recorded hologram interference stripes and heat-treated, the substance for shifting recorded wavelength is diffused in the volume hologram layer. Thus, the substance has actions to enlarge distances between hologram interference stripes recorded therein, to shift the reproduced wavelength to a long wavelength side, and to enlarge diffraction wavelength characteristics. In the case that the film for shifting recorded wavelength is arranged, the second adhesive layer 4 does not necessarily contain any shifting component but the first adhesive layer 3 adjacent to the volume hologram layer 5 may contain the substance for shifting recorded wavelength as a shifting component similar to the first to third volume hologram laminates. In the case that the film for shifting recorded wavelength is arranged between the first adhesive layer 3 and the volume hologram layer 5, the second adhesive layer 4 may contain the substance for shifting wavelength as a shifting component.

Next, the surface protecting film 6 in the volume hologram laminate according to the invention has a transparent property. There may be exemplified polyethylene film, polypropylene film, polyethylene fluoride type film, polyvinylidene fluoride film, polyvinyl chloride film, polyvinylidene chloride film, ethylene-vinyl alcohol film, polyvinyl alcohol film, polymethyl methacrylate film, polyether sulfone film, polyether ether ketone film, polyamide film, tetrafluoroethyleneperfluoroalkylvinyl ether copolymer film, polyester films such as polyethylene terephthalate film and polyimide film etc. A film thickness is 2 $\mu$m–200 $\mu$pm, preferably 10 $\mu$m–50 $\mu$m.$\mu$m In the case that the volume hologram layer has an adhesive property in the volume hologram laminate, the adhesive layer, the volume hologram layer and the surface protecting film are arranged on the substrate in the described order. In the surface protecting film, a plasticizer is generally contained. In this case, the balance of the shifting component may be adjusted between the adhesive layer, the volume hologram layer and the surface protecting film respectively by the above-mentioned method.

Although not shown in the drawings, the surface protecting film may be subjected to hard-coating treatment if necessary with an object to increase the protecting property of the surface protecting film. Hard-coating treatment may be carried out by coating silicone type, fluorine-containing silicone type, melamine alkyd type and urethane-acrylate type (ultraviolet curable type) agents by means of a dip coating, a spray coating or a roll coating to a film thickness of 1 $\mu$m–50 $\mu$m, preferably 3 $\mu$m–25 $\mu$m.

Further, although not shown in the drawings, a releasing treatment may be carried out on the surface or the hard-coated surface of the surface protective film 6. The releasing treatment may be carried out by dip coating, a spray coating or a roll coating of a fluorine type releasing agent, a silicone type releasing agent, a stearate type releasing agent or wax type releasing agent etc.

Figure 6:
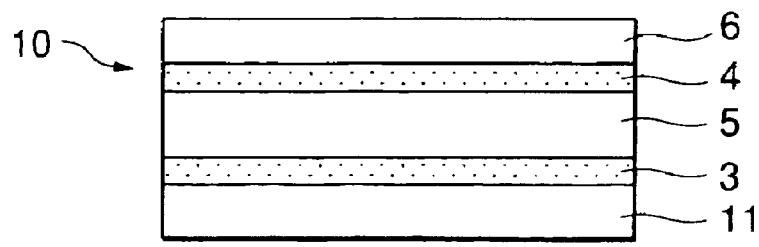
FIG. 6, FIG. 7 and FIG. 9 are drawings explaining labels for preparation of volume hologram laminates according to the invention by means of cross-sectional views.
Figure 7:
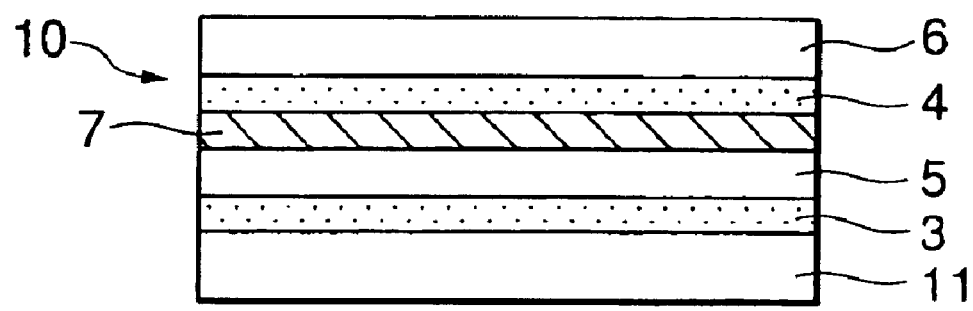

Then, as to labels for preparation of volume hologram laminates according to the fifth to the seventh aspects used for preparation of the volume hologram laminates according to the first to the third aspects, the cross-sectional laminar constitution is shown in FIG. 6. As to the label for preparation of the eighth volume hologram laminate used for preparation of the fourth volume hologram laminate, its cross-sectional laminar constitution is shown in FIG. 7. In the drawings, reference numeral 10 denotes a label for preparation of a volume hologram laminate, reference numeral 11 denotes a release liner sheet, and other symbols identical to FIG. 1 and FIG. 2 have identical meanings.

The labels for preparation of a volume hologram laminates according to the fifth to the seventh aspects of the invention are used for preparation of the above-mentioned first to third volume hologram laminates. As shown in FIG. 6, a first adhesive layer 3, a volume hologram layer 5, a second adhesive layer 4 and a surface protecting film 6 are laminated on a delaminating paper 11. Further, the label for preparation of the volume hologram laminate according to the eighth aspect of the invention is used for preparation of the above-mentioned the fourth volume hologram laminate. As shown in FIG. 7, a film 7 for shifting recorded wavelength is put between a volume hologram layer 5 and a second adhesive layer 4. In FIG. 7, a film 7 for shifting recorded wavelength is put between a volume hologram layer 5 and a second adhesive layer 4 but it may be arranged between a volume hologram layer 5 and a second adhesive layer 3.

As the delaminating paper 11, there may be used delaminating film which is subjected to a delaminating treatment by means of a fluorine type delaminating agent or a silicone type delaminating agent on a surface of a polyethylene terephthalate film, in addition to the conventionally used delaminating papers. Further, also on a surface not in the adhesive layer side of the delaminating paper, a delaminating treatment may be carried out in order to avoid blocking due to an adhesive bled out from the label side. Further, in order to delaminate the laminate from the delaminating paper in an appropriate size, the laminate may be subjected to a so-called half-cutting process, or the delaminating paper may have cutting parts such as perforations. A label 10 is laminated on a substrate from a first adhesive layer 3 side after delamination of a delamination paper 11, to prepare volume hologram laminates according to the first to the fourth aspects shown in FIG. 1 and FIG. 2.

A SECOND INVENTION

Figure 8:
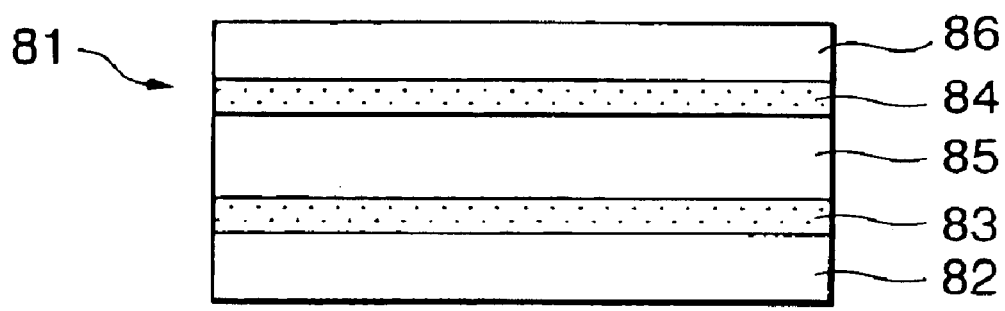

A volume hologram laminate according to the first or the second aspects of the second invention is shown in FIG. 8 by means of a cross-sectional view. In the drawing, reference numeral 81 denotes a volume hologram laminate, reference numeral 82 denotes a substrate, reference numeral 83 denotes a first adhesive layer, reference numeral 84 is a second adhesive layer, reference numeral 85 denotes a volume hologram layer, and reference numeral 86 denotes a surface protecting film.

As a substrate 82 in the volume hologram laminate according to the invention, a film or a sheet comprising paper, synthetic paper, synthetic resin or metal can be used. The substrate can be shaped in various forms, for example, sheets such as a certificate for examination, cards such as an ID card, or pamphlets such as a passport. A hologram body in which a mono-color or full-color image are recorded can be laminated onto a picture of personal features or landscapes. Further, in the case for a color filter of a liquid crystalline display element, a glass substrate or an electrode layer in a liquid crystalline cell may be a substrate.

The volume hologram laminate according to the invention is shown in FIG. 8. Therein, a volume hologram layer 85 is laminated on a substrate 82 via an adhesive layer 83. It may take, however, such a constitution that a volume hologram layer 85 is laminated on a substrate 82 via a both-side adhesive tape.

The volume hologram layer 85 is prepared by coating a volume hologram recording material on a supporting film and thereafter recording interference stripes corresponding to wave front of light from an object to be recorded in a form of transparency modulation or refractive index modulation. It may be a color-hologram by which two or more colors being reproduced, or may be a mono-color hologram. For replication, it can be prepared easily by adhering a volume hologram original plate closely, exposing and developing.

The volume hologram layer 85 is a photosensitive material for dry volume phase type hologram recording which comprises a matrix polymer, a photopolymerizable compound, a photopolymerization initiator, a sensitizing pigment, and if necessary a plasticizer and a surfactant.

As photopolymerizable compounds, there may be mentioned photopolymerizable or photocrosslinkable monomers, oligomers and prepolymers having at least one ethylenic unsaturated bonding and their mixtures. As specific examples thereof, for example, unsaturated carboxylic acids and their salts, esters of unsaturated carboxylic acids and aliphatic polyvalent alcohol compounds, as well as amide-bonded compounds of unsaturated carboxylic acids and aliphatic polyvalent amine compounds may be mentioned.

As concrete examples of unsaturated carboxylic acid monomers, there may be mentioned acrylic acid, methacrylic acid, itaconic acid, crotonic acid, isocrotonic acid, maleic acid, and their halogen-substituted unsaturated carboxylic acids, such as chlorinated unsaturated carboxylic acids, brominated unsaturated carboxylic acids and fluorinated unsaturated carboxylic acids. As salts of unsaturated carboxylic acids, there may be mentioned sodium salts and potassium salts of the above-mentioned acids.

Further, as concrete examples of ester monomers of aliphatic polyvalent alcohol compounds and unsaturated carboxylic acids, the following compounds may be mentioned: as acrylate esters, ethylene glycol diacrylate, triethylene glycol diacrylate, 1,3-butandiol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl)ether of bisphenol A, diacrylate of ethoxylated bisphenol A, 2-(1-naphthyloxy)ethyl acrylate, o-biphenyl methacrylate and o-biphenyl acrylate etc.

As esters of methacrylic acid, there may be mentioned tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]dimethylmethane, bis-[p-(acryloxyethoxyphenyl)dimethylmethane, 2,2-bis(4-methacryloyloxyphenyl)propane and 2-naphthyl methacrylate etc.

As esters of itaconic acid, there may be mentioned ethylene glycol diitaconate, propylene glycol diitaconate, 1,3-butanediol diitaconate, 1,4-butanediol diitaconate, tetramethylene glycol diitaconate, pentaerythritol diitaconate and sorbitol tetraitaconate etc.

As esters of crotonic acid, there may be mentioned ethylene glycol dicrotonate, tetramethylene glycol dicrotonate, pentaerythritol dicrotonate and sorbitol tetracrotonate etc.

As esters of isocrotonic acid, there may be mentioned ethylene glycol diisocrotonate, pentaerythritol diisocrotonate and sorbitol tetraisocrotonate etc.

As esters of maleic acid, there may be mentioned ethylene glycol dimaleate, triethylene glycol dimaleate, pentaerythritol dimaleate and sorbitol tetramaleate etc.

As halogenated unsaturated carboxylic acids, there may be mentioned 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (tradename: NK ESTER DBN; made by Shinnakamura Kagaku Kogyo Co. Ltd.), dibromopropyl acrylate (tradename: NK ESTER A-DBP; made by Shinnakamura Kagaku Kogyo Co. Ltd.), dibromopropyl methacrylate (tradename: NK ESTER DBP; made by Shinnakamura Kagaku Kogyo Co. Ltd.), chloride methacrylate, 2,4,6-trichlorophenyl methacrylate, p-chlorostyrene, methyl-2-chloroacrylate, ethyl-2-chloroacrylate, n-butyl-2-chloroacrylate, tribromophenol acrylate and tetrabromophenol acrylate etc.

Further, as concrete examples of amido monomers of unsaturated carboxylic acids and aliphatic polyvalent amine compounds, there may be mentioned methylenebisacrylamide, methylenebismehtacrylamide, 1,6-hexamethylenebisacrylamide, 1,6-hexamethylenebismethacrylamide, diethylenetriaminetrisacrylamide, xylylenebisacrylamide, xylylenebismethacrylamide, N-phenylmethacrylamide and diacetoneacrylamide etc.

As other examples, there may be mentioned polyisocyanate compounds having two or more isocyanate groups in one molecular described in Japanese Patent Publication No. Sho 48-41708, and vinyl urethane compounds containing two or more polymerizable vinyl group in which vinyl monomer containing hydroxyl group expressed by the following formula

$$CH_2=C(R)COOCH_2CH(R')OH,$$

wherein R and R' denote hydrogen or methyl group, being added.

Further, there may be mentioned urethane acrylates described in Japanese Patent Laid-Open Publication No. Sho 51-37193, polyester acrylates, polyfunctional acrylates and methacrylates of epoxy resins and (math) acrylic acid etc. described in Japanese Patent Laid-Open Publication No. Sho 48-64183, Japanese Patent Publication No. Sho 49-43191 and Japanese Patent Publication No. Sho 52-30490, respectively.

Further, those disclosed in Japan Adhesive Association Journal Vol.20, No.7, 300–308 pages as photocurable monomers and oligomers may be used.

Additionally, as monomers containing phosphorus, there may be mentioned mono(2-acryloyloxyethyl)acid phosphate (tradename: LIGHTESTER PA, made by Kyoeisha Yushi Kagaku Kogyo Co. Ltd.), mono(2-methacryloyloxyethyl) acid phosphate (tradename: LIGHTESTER PM, made by Kyoeisha Yushi Kagaku Kogyo Co. Ltd.) as well as epoxy-acrylate types such as tradename: RIPOXY VR-60 (made by Showa Kobunshi Co. Ltd.) and tradename: RIPOXY VR-90 (made by Showa Kobunshi Co. Ltd.).

Further, there are also mentioned tradename: NK ESTER M-230G (made by Shinnakamura Kagaku Kogyo Co. Ltd.)

and tradename: NK ESTER 23G (made by Shinnakamura Kagaku Kogyo Co. Ltd.).

Further, there may be mentioned triacrylates having the following structural formulae:

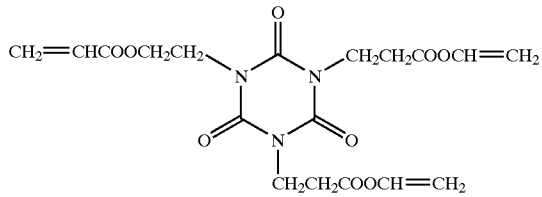

(made by Toa Gosei Kagaku Kogyo Co. Ltd.; tradename: ARONIX M-315),

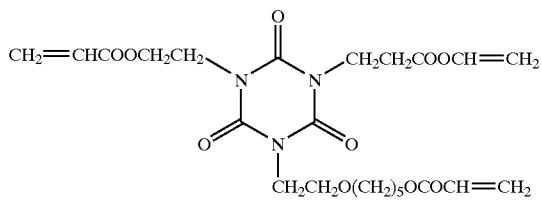

(made by Toa Gosei Kagaku Kogyo Co.Ltd.; tradename: ARONIXM-325), as well as 2,2'-bis(4-acryloxydiethoxyphenyl)propane (made by Shinnakamura Kagaku Kogyo Co. Ltd.; tradename: NK ESTER A-BPE-4) and tetramethylolmethane tetraacrylate (made by Shinnakamura Kagaku Kogyo Co. Ltd.; tradename: NK ESTER A-TMMT) etc.

Further, as plasticizers to be added if necessary, there may be mentioned polyvalent alcohols such as ethylene glycol, diethylene glycol, triethylene glycol, tetraethylene glycol, glycerol and trimethylolpropane; their derivatives in which terminal hidoroxyl group being blocked by etherification or acetylation; polyalkylene glycols such as polyethylene glycols having a weight average molecular weight of 200–2,000, preferably 200–600 and polypropylene glycols having a weight average molecular weight of 300–2,000, preferably 300–1,000; polyester type plasticizers, for example, phthalate type plasticizers such as dimethyl phthalate (DMP), diethyl phathalate (DEP), dibutyl phthalate (DBP), heptyl-nonyl phthalate (HNP), di-2-ethylhexyl phthalate (DOP), di-n-octyl phthalate (DNOP), di-i-octyl phthalate (DCapP), phthalic acid (79alkyl)(D79P), di-i-decyl phthalate (DIDP), ditridecyl phthalate (DTDP), dicyclohexyl phthalate (DCHP), butylbenzyl phthalate (BDP), ethylphthalylethyl glycolate (EPEG), butylphthalylbutyl glycolate (BPBG); aliphatic dibasic acid ester type plasticizers such as di-2-ethylhexyl adipate (DOA), di-(methylcyclohexyl) adipate, diisodecyl adipate (DIDA), di-n-hexyl azelate (DNHZ), di-2-ethylhexyl azalate (DOZ), dibutyl sebacate (DBS), di-2-ethylhexyl sebacate(DOS); citrate type plasticizers such as triethyl citrate (TEC), tributyl citrate (TBC), triethyl acetylcitrate (ATEC), tributyl acetylcitrate (ATBC); epoxy type plasticizers such as epoxidized soy oil; as well as phosphate type plasticizers such as tributyl phosphate (TBP), triphenyl phosphate (TPP), tricresyl phosphate (TCP) and tripropylene glycol phosphate.

Then, as photopolymerization initiators belonging to initiators systems, there may be exemplified 1,3-di(t-butyldioxylcarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isoxazolone, 2-mercaptobenzimidazole and imidazole dimers etc. It is preferable that the photopolymerization initiator is decomposed after hologram recording from the viewpoint of stabilization of recorded hologram. For example, organic peroxide type initiators are preferable since they can be decomposed easily by ultraviolet irradiation.

As sensitizing pigments (dyes), there may be exemplified thiopyrylium salt type pigments, merocyanine type pigments, quinoline type pigments, styrylquinoline type pigments, ketocoumarine type pigments, thioxanthene type pigments, xanthene type pigments, oxonol type pigments, cyanine dyestuf fs, rhodamine dystuffs, thiopyrylium salt type pigments, pyrylium ion type pigments and diphenyl iodonium ion type pigments etc, which have absorption spectra in a wavelength range of 350–600 nm. Also, sensitizing pigments having absorption spectra in a wavelength range of below 350 nm or above 600 nm may be used.

As matrix polymers, there may be mentioned polymethacrylates or their partial hydrolysates, polyvinyl acetate or its hydrolysates, polyvinyl alcohol or its partial acetylated compounds, triacetyl cellulose, polyisoprene, polybutadiene, polychloroprene, silicone rubber, polystyrene, polyvinyl butyral, polychloroprene, polyvinyl chloride, chlorinated polyethylene, chlorinated polypropylene, poly-N-vinylcarbazole or its derivatives, poly-N-vinylpyrrolidone or its derivatives, copolymer of styrene and maleic anhydride or its half esters, copolymers containing at least one of copolymerizable monomers such as acrylic acid, acrylate, methacrylic acid, methacrylate, acrylamide, acrylonitrile, ethylene, propylene, vinyl chloride and vinyl acetate as a polymerization component, or their mixtures. Preferably, there may be mentioned polyisoprene, polybutadiene, polychloroprene, polyvinyl alcohol, polyvinyl acetal which is a partially acetalated compound of polyvinyl alcohol, polyvinyl butyral, polyvinyl acetate, ethylene-vinyl acetate copolymer, vinyl chloride-vinyl acetate copolymer and their mixtures.

As a stabilizing step for recorded hologram, there may be a monomer shifting step by means of heating. For it, it is necessary that the matrix polymer has preferably a relatively low glass transition temperature for easy monomer shifting.

The photopolymerizable compound is used in a proportion of 10–1,000 parts by weight, preferably 10–100 parts by weight, to 100 parts by weight of a binder resin.

The photopolymerization initiator is used in a proportion of 1–10 parts by weight, preferably 5–10 parts by weight, to 100 parts by weight of a binder resin.

The sensitizing pigment is used in a proportion of 0.01–1 parts by weight, preferably 0.01–0.5 parts by weight, to 100 parts by weight of a binder resin.

Further, as photosensitive material components, there may be mentioned various non-ionic surfactants, cationic surfactants and anionic surfactants.

The hologram recording material is made into a coating solution with a solid content of 15%–25% by using acetone, methylethylketone, methylisobutylketone, cyclohexanone, benzene, toluene, xylene, chlorobenzene, tetrahydrofurane, methylcellosolve, ethylcellosolve, methylcellosolve acetate, ethyl cellosolve acetate, ethyl acetate, 1,4-dioxane, 1,2-dichloroethane, dichloromethane, chloroform, methanol, ethanol or isopropanol, or their mixtures. A thickness of the hologram recording layer after dried is 0.1 μm–50 μm, preferably 5 μm–20 μm.

As such hologram materials, there may be mentioned OMNIDEX 352 and 706 made by DuPont Co. Ltd.

Then, adhesive layers 83 and 84 are explained. As adhesive layers, there may be mentioned acrylic resins, acrylate resins, or their copolymers, styrene-butadiene copolymers, natural rubbers, casein, gelatin, rosin esters, terpene resins, phenol type resins, styrene type resins, chromaneindene resins, polyvinyl ethers, silicone resins, as well as alpha-cyanoacrylate type, silicone type, maleimide type, styrene type, polyolefin type, resorsinol type, polyvinyl ether type and silicone type adhesives. Further, the adhesive layers may be formed by using so-called crosslinking type two component adhesives which are crosslinked by addition of isocyanate type crosslinking agents or metallic chelate type crosslinking agents etc. at the time of use. Further, as adhesive layers, there may be used heat-sealing agents, for example, ethylene-vinyl acetate copolymerized resins, polyamide resins, polyester resins, polyethylene resins, ethylene-isobutyl acrylate copolymerized resins, butyral resins, polyvinyl acetate and its copolymerized resins, cellulose derivatives, polymethyl methacrylate resins, polyvinyl ether resins, polyurethane resins, polycarbonate resins, polypropylene resins, epoxy resins, phenol resins, thermoplastic elastomers such as SBS, SIS, SEBS and SEPS, and reactive hot-melt type resins etc. A thickness of the adhesive layer may be 4 $\mu$m–20 $\mu$m.

The first volume hologram laminate according to the invention is characterized in that a substance with a refractive index of at least 0.1 at 25° C. lower than that of a volume hologram recording material in a volume hologram layer for shifting a recorded wavelength is contained in at least one of the adhesive layers 83 and 84.

"Refractive index of a volume hologram layer" and "refractive index of a substance for shifting a wavelength" described herein are measured in accordance with JIS K7142 (a method of measuring refractive index of plastics) according to the following methods. (Used device) multiwavelength Abbe refractometer DR-M2 (made by Atago Co. Ltd.)
(Interference filter) 486 nm
(Intermediate solution) monobromonaphthalene, refractive index=1.657 (at a wavelength of 587 nm)
(Auxiliary glass for sample measurement)
glass material: S-LAL14 made by Ohara Co. Ltd., refractive index=1.6968 (at a wavelength of 587 nm);
size: 20×8×3 mm
Processing: 20×8 one surface conventional optical polishing
  (surface to be measured)
  8×3 one surface polishing (surface roughness:
    6.3 $\mu$Ra or less)
    (lighting surface))
  square 0.5 C total perimeter 0.3 C chamfering
(Measuring method)

A sample to be measured is laminated on a surface to be measured of an auxiliary glass for sample measurement at a thickness of about 100 $\mu$m. After drying well, the sample is arranged on a main prism of a sample table in a refractometer via an intermediate solution with the surface to be measured being directed downward. Then the auxiliary glass is adhered closely, to prepare for measurement.

A refractive index of the volume hologram layer is obtained by measuring as a film form of the volume hologram layer with use of an Abbe refractometer made by Atago Co. Ltd. That of the second volume hologram laminate described hereinafter is the same. Further, a refractive index of the substance for shifting a recorded wavelength is obtained by measuring similarly a film consisting 100% of the substance. A refractive index according to the invention may be applied as at 25° C. and 400–800 mn. However, for comparison, refractive index measured at the identical wavelength should be of course used.

As the substances for shifting recorded wavelength, those with a refractive index at least 0.1 lower than, preferably at least 0.13 lower than, that of the volume hologram recording layer. In the case where the volume hologram layer comprises a photopolymerizable compound, the refractive index thereof is generally about 1.5. For those volume hologram laminates, there may be mentioned silicone type compounds and fluorine type compounds with a refractive index of 1.4 or less as the substances for shifting recorded wavelength.

As silicone type compounds, there may be mentioned silicone oils such as amino-modified silicone oils, epoxy-modified silicone oils, carboxyl-modified silicone oils, methacryl-modified silicone oils and fluorine-modified silicone oils. For example, "KF-858, refractive index: 1.394", "KF96-l0, refractive index: 1.399" and "KF96 L-1, refractive index: 1.382" all made by Shinetsu Kagaku Kogyo Co. Ltd. may be exemplified. Further, silane compounds such as trimethylchlorosilane, methyltrimethoxysilane, methyltriethoxysilane, dimethyldimethoxysilane and trimethylmethoxysilane or their mixtures may be exemplified.

As fluorine type compounds, there may be exemplified tetrafluoroacetic acid, chlorofluoroethylene, trifluoromethyl-benzaldehyde, 1,4-bistrifluoromethylbenzene, trifluoromethyl-benzylalcohol or their derivatives or mixtures.

The second volume hologram laminate according to the invention is characterized in that a substance with a refractive index of at least 0.06, preferably 0.1, at 25° C. higher than that of a volume hologram layer for shifting a recorded wavelength is contained in at least one of the adhesive layers 83 and 84. In the case that the volume hologram layer comprises a photopolymerizable compound, the refractive index thereof is generally about 1.5. For those volume hologram laminates, there may be mentioned aromatic compounds with a refractive index of 0.06 or more as the substances for shifting recorded wavelength. As the aromatic compounds, 3-phenylpyridine, 2-phenylpyridine, diphenyl sulfide, 1,1-diphenylethylene, 1'-acetonaphthone and 1-naphthoaldehyde may be exemplified. Their iodides and bromides may be used, such as 1-bromonaphthalene, 1,2-dibromobenzene and 3-iodoaniline.

Further, there may be also used rosin type tackifiers, terpene type tackifiers and synthetic resin type tackifiers or their mixture exemplified above as adhesives for the above-mentioned adhesive layer, if they have a refractive index of 0.06 higher than that of the volume hologram layer. As rosin type tackifiers, there may be exemplified concretely gum rosins, tall oil rosins, wood rosins, hydrogenated rosins and polymerized rosins. Further, as terpene type tackifiers, there may be exemplified concretely terpene resins containing $\alpha$-pinene and aromatic modified terpenes. Further, as synthetic resin type tackifiers, there may be exemplified concretely cyclopentadiene, styrene and xylene as such or in their copolymer forms.

In the first or second volume hologram laminate according to the invention, the substance for shifting a recorded wavelength is a substance that can be shifted from the adhesive layer to the volume hologram layer after being added to the adhesive layer and constituted as a component of the volume hologram laminate. The substance is not limited to the above-mentioned substance for shifting a recorded wavelength, if the substance has the above-mentioned relationship with the refractive index in the volume hologram layer.

In the invention, a reproduced wavelength can be shifted to the blue region wavelength from a recorded wavelength by using the substance for shifting a recorded wavelength with a refractive index of at least 0.1 lower than that of the volume hologram laminate. Also, the reproduced wavelength can be shifted to red from the recorded wavelength by using the substance for shifting a recorded wavelength with a refractive index of at least 0.06 higher than that of the volume hologram layer. The extent of shifting can be easily controlled by selecting appropriately a kind and an added amount of the substance for shifting a recorded wavelength. Particularly, in the substance for shifting a recorded wavelength to the blue region wavelength, the obtained reproduced wavelength is shifted not to a long wavelength side and shifted to a short wavelength side even though it has a function to shift into the volume hologram layer and swell it. The detailed reason therefor is not clear. As the result, the wavelength can be shifted to a shorter wavelength, i.e., an optional blue region wavelength.

The substance for shifting a recorded wavelength is dissolved and dispersed in an organic solvent together with the above-mentioned adhesive. After coating on a delaminating paper and drying, an adhesive layer is obtained. The substance may be added in the adhesive layer in an amount in the range of 0.1%–20% by weight, preferably 1%–7% by weight. If it is higher than 20% by weight, it is not preferable since it hinders an adhesive property.

Further, in the volume hologram laminate according to the invention, the extent of blue or red region wavelength shifting can be controlled better if shifting components other than the substance for shifting a recorded wavelength are not shifted between the first adhesive layer and/or the second adhesive layer and the volume hologram layer. Therefore, the shifting components may be balanced with the shifting component in the volume hologram layer by adding these components into the adhesive layer. As these shifting components, there may be mentioned photopolymerizable compounds and plasticizers described above as the constituting materials in the volume hologram layer.

The shifting components to be contained in the adhesive layer may be different from the photopolymerizable compounds and plasticizers described above as the constituting materials in the volume hologram layer. For example, there may be mentioned surfactants and polyalkylene glycols etc. Those having a low molecular weight of 100–5,000, particularly 100–2,000, are preferably used. If the molecular weight is lower than 100, those may become volatile which is not preferable. Also, if the molecular weight is higher than 5,000, the shifting property is decreased and the object for addition may not be attained.

Further, as the shifting components contained in the adhesive layer, it is preferable to select a substance having compatibility with the constituting components of the volume hologram layer. Also, the substance is required not to shift into the volume hologram layer and destroy completely the recorded interference stripes or not to make reproduction of recording impossible. In addition, the shifting component, i.e. the substance for shifting recorded wavelength, contained in the adhesive layer may be contained in the adhesive layer in an amount not to lose its adhesive property, such as 20% by weight or less. However, its content is appropriately set depending on the relationship with an amount of the shifting component in the volume hologram layer and on the relationship with a desirable reproduced wavelength.

Next, the surface protecting film 86 in the volume hologram laminate according to the invention has a transparent property. There may be exemplified polyethylene film, polypropylene film, polyethylene fluoride type film, polyvinylidene fluoride film, polyvinyl chloride film, polyvinylidene chloride film, ethylene-vinyl alcohol film, polyvinyl alcohol film, polymethyl methacrylate film, polyether sulfone film, polyether ether ketone film, polyamide film, tetrafluoroethyleneperfluoroalkylvinyl ether copolymer film, polyester films such as polyethylene terephthalate film and polyimide film etc. A film thickness is 2 $\mu$m–200 $\mu$m, preferably 10 $\mu$m–50 $\mu$m.

In the case that the volume hologram layer has an adhesive property in the volume hologram laminate, the adhesive layer, the volume hologram layer and the surface protecting film are arranged on the substrate in the described order. In the surface protecting film, a plasticizer is generally contained. In this case, the balance of the shifting component may be adjusted between the adhesive layer, the volume hologram layer and the surface protecting film respectively by the above-mentioned method.

Although not shown in the drawings, the surface protecting film may be subjected to hard-coating treatment if necessary with an object to increase protecting property of the surface protecting film. Hard-coating treatment may be carried out by coating silicone type, fluorine-containing silicone type, melamine alkyd type and urethane-acrylate type (ultraviolet curable type) agents by means of a dip coating, a spray coating or a roll coating to a film thickness of 1 $\mu$m–50 $\mu$m, preferably 3 $\mu$m–25 $\mu$m.

Further, while not shown in the drawings, a releasing treatment may be carried out on the surface or the hard-coated surface of the surface protective film 86. The releasing treatment may be carried out by dip coating, a spray coating or a roll coating of a fluorine type releasing agent, a silicone type releasing agent, a stearate type releasing agent or wax type releasing agent etc.

The volume hologram layer in the volume hologram laminate according to the invention may be recorded holographically by using a single recording wavelength or color-recorded holographically by using two or more wavelengths.

Figure 9:
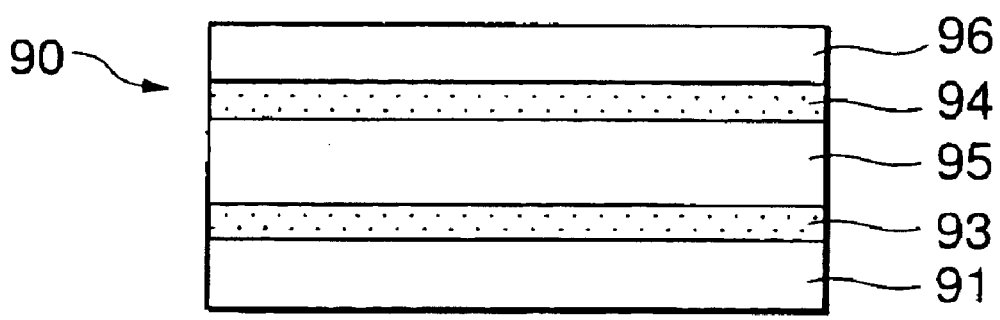

Then, as to labels for preparation of volume hologram laminates according to the invention, the cross-sectional laminar constitution is shown in FIG. 9. In the drawing, reference numeral 90 denotes a label for preparation of a volume hologram laminate, reference numeral 91 denotes a delaminating paper, and other symbols identical to FIG. 8 have identical meanings.

The label for preparation of a volume hologram laminate according to the invention is used for preparation of the volume hologram laminates. As shown in FIG. 9, a first adhesive layer 93, a volume hologram layer 95, a second adhesive layer 94 and a surface protecting film 96 are laminated on a delaminating paper 91.

As the delaminating paper 91, there may be used delaminating film which is subjected to a delaminating treatment by means of a fluorine type delaminating agent or a silicone type delaminating agent on a surface of a polyethylene terephthalate film, in addition to the conventionally used delaminating papers. Further, also on a surface not in the adhesive layer side of the delaminating paper, a delaminating treatment may be carried out in order to avoid blocking due to an adhesive bled out from the label side. Further, in order to delaminate the laminate from the delaminating paper in an appropriate size, the laminate may be subjected to a so-called half-cutting process, or the delaminating paper may have cutting parts such as perforations.

A label 90 is laminated on a substrate from a first adhesive layer 93 side after delamination of a delamination paper 91, to prepare volume hologram laminates according to the first to the fourth aspects shown in FIG. 8.

A THIRD INVENTION

Figure 10:
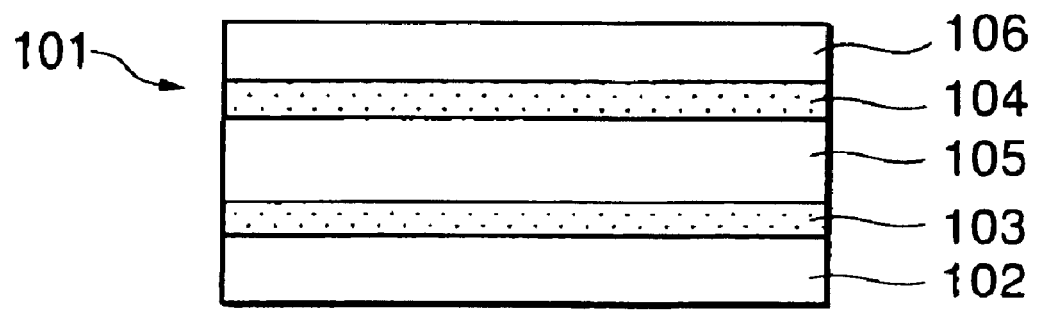

A volume hologram laminate according to the third invention is shown in FIG. 10 by means of a cross-sectional view. In the drawing, reference numeral 101 denotes a volume hologram laminate, reference numeral 102 denotes a substrate, reference numeral 103 denotes a first adhesive layer, reference numeral 104 is a second adhesive layer, reference numeral 105 denotes a volume hologram layer, and reference numeral 106 denotes a surface protecting film.

As a substrate 102 in a volume hologram laminate according to the invention, a film or a sheet comprising paper, synthetic paper, synthetic resin or metal can be used. The substrate can be shaped in various forms, for example, sheets such as a certificate for examination, cards such as an ID card, or pamphlets such as a passport. It is used as a substrate for attaching a volume hologram body in which a face picture or a landscape is recorded holographically in a mono-color or full-color mode. Further, in the case for a color filter of a liquid crystalline display element, a glass substrate or an electrode layer in a liquid crystalline cell may be a substrate.

The volume hologram laminate according to the invention is shown in FIG. 10 as a constitution in which a volume hologram layer 105 is laminated on a substrate 102 via an adhesive layer 103. It may take, however, such a constitution that a volume hologram layer 105 is laminated on a substrate 102 via a both-side adhesive tape.

The volume hologram layer 105 is prepared by coating a volume hologram recording material on a supporting film and thereafter recording interference stripes corresponding to a wave front of light from an object to be recorded in a form of transparency modulation or refractive index modulation. It may be a color-hologram by which two or more colors being reproduced, or may be a mono-color hologram. For replication, it can be prepared easily by adhering a volume hologram original plate closely, exposing and developing.

The volume hologram layer 105 is a photosensitive material for dry volume phase type hologram recording which comprises a matrix polymer, a photopolymerizable compound, a photopolymerization initiator, a sensitizing pigment, and if necessary a plasticizer and a surfactant.

As photopolymerizable compounds, there may be mentioned photopolymerizable or photocrosslinkable monomers, oligomers and prepolymers having at least one ethylenic unsaturated bonding and their mixtures. As specific examples thereof, for example, unsaturated carboxylic acids and their salts, esters of unsaturated carboxylic acids and aliphatic polyvalent alcohol compounds, as well as amide-bonded compounds of unsaturated carboxylic acids and aliphatic polyvalent amine compounds may be mentioned.

As concrete examples of unsaturated carboxylic acid monomers, there may be mentioned acrylic acid, methacrylic acid, itaconic acid, crotonic acid, isocrotonic acid, maleic acid, and their halogen-substituted unsaturated carboxylic acids, such as chlorinated unsaturated carboxylic acids, brominated unsaturated carboxylic acids and fluorinated unsaturated carboxylic acids. As salts of unsaturated carboxylic acids, there may be mentioned sodium salts and potassium salts of the above-mentioned acids.

Further, as concrete examples of ester monomers of aliphatic polyvalent alcohol compounds and unsaturated carboxylic acids, the following compounds may be mentioned: as esters of acrylic acid, ethylene glycol diacrylate, triethylene glycol diacrylate, 1,3-butandiol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl)ether of bisphenol A, diacrylate of ethoxylated bisphenol A, 2-(1-naphthyloxy)ethyl acrylate, o-biphenyl methacrylate and o-biphenyl acrylate etc.

As esters of methacrylic acid, there may be mentioned tetramehylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis-[p-(3-methacryloxy-2-hydroxypropoxy)phenyl]dimethylmethane, bis-[p-(acryloxyethoxyphenyl)dimethylmethane, 2,2-bis(4-methacryloyloxyphenyl)propane and 2-naphthyl methacrylate etc.

As esters of itaconic acid, there may be mentioned ethylene glycol diitaconate, propylene glycol diitaconate, 1,3-butanediol diitaconate, 1,4-butanediol diitaconate, tetramethylene glycol diitaconate, pentaerythritol diitaconate and sorbitol tetraitaconate etc.

As esters of crotonic acid, there may be mentioned ethylene glycol dicrotonate, tetramethylene glycol dicrotonate, pentaerythritol dicrotonate and sorbitol tetracrotonate etc. As esters of isocrotonic acid, there may be mentioned ethylene glycol diisocrotonate, pentaerythritol diisocrotonate and sorbitol tetraisocrotonate etc.

As esters of maleic acid, there may be mentioned ethylene glycol dimaleate, triethylene glycol dimaleate, pentaerythritol dimaleate and sorbitol tetramaleate etc.

As halogenated unsaturated carboxylic acids, there may be mentioned 2,2,3,3-tetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, 2,4,6-tribromophenyl methacrylate, dibromoneopentyl dimethacrylate (tradename: NK ESTER DBN; made by Shin Nakamura Kagaku Kogyo Co. Ltd.), dibromopropyl acrylate (tradename: NK ESTER A-DBP; made by Shin Nakamura Kagaku Kogyo Co. Ltd.), dibromopropyl methacrylate (tradename: NK ESTER DBP; made by Shin Nakamura Kagaku Kogyo Co. Ltd.), chloride methacrylate, 2,4,6-trichlorophenyl methacrylate, p-chlorostyrene, methyl-2-chloroacrylate, ethyl-2-chloroacrylate, n-butyl-2-chloroacrylate, tribromophenol acrylate and tetrabromophenol acrylate etc.

Further, as concrete examples of amido monomers of unsaturated carboxylic acids and aliphatic polyvalent amine compounds, there may be mentioned methylenebisacrylamide, methylenebismethacrylamide, 1,6-hexamethylenebisacrylamide, 1,6-hexamethylenebismethacrylamide, diethylenetriaminetrisacrylamide, xylylenebisacrylamide, xylylenebismethacrylamide, N-phenylmethacrylamide and diacetoneacrylamide etc.

As other examples, there may be mentioned polyisocyanate compounds having two or more isocyanate groups in one molecular described in Japanese Patent Publication No. Sho 48-41708, and vinyl urethane compounds containing two or more polymerizable vinyl groups in which vinyl monomer containing hydroxyl group expressed by the following formula

$CH_2=C(R)COOCH_2CH(R')OH$, wherein R and R' denote hydrogen or methyl group, being added.

Further, there may be mentioned urethane acrylates described in Japanese Patent Laid-Open Publication No. Sho 51-37193, polyester acrylates, polyfunctional acrylates and methacrylates of epoxy resins and (math)acrylic acid etc. described in Japanese Patent Laid-Open Publication No. Sho 48-64183, Japanese Patent Publication No. Sho 49-43191 and Japanese Patent Publication No. Sho 52-30490, respectively.

Further, those disclosed in Japan Adhesive Association Journal Vol.20, No.7, 300–308 pages as photocurable monomers and oligomers may be used.

Additionally, as monomers containing phosphorus, there may be mentioned mono(2-acryloyloxyethyl)acid phosphate (tradename: LIGHTESTER PA, made by Kyoeisha Yushi Kagaku Kogyo Co. Ltd.), mono(2-methacryloyloxyethyl) acid phosphate (tradename: LIGHTESTER PM, made by Kyoeisha Yushi Kagaku Kogyo Co. Ltd.) as well as epoxyacrylate types such as tradename: RIPOXY VR-60 (made by Showa Kobunshi Co. Ltd.) and tradename: RIPOXY VR-90 (made by Showa Kobunshi Co. Ltd.).

Further, there are also mentioned tradename: NK ESTER M-230G (made by Shinnakamura Kagaku Kogyo Co. Ltd.) and tradename: NK ESTER 23G (made by Shinnakamura Kagaku Kogyo Co. Ltd.).

Further, there may be mentioned triacrylates having the following structural formulae:

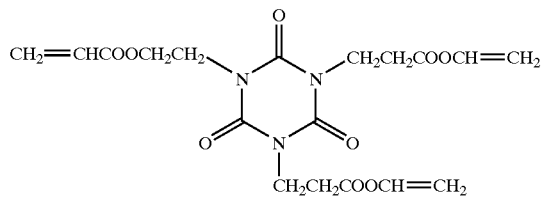

(made by Toa Gosei Kagaku Kogyo Co. Ltd.; tradename: ARONIX M-315),

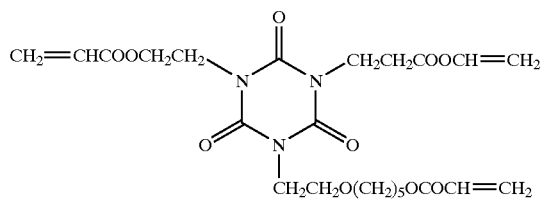

(made by Toa Gosei Kagaku Kogyo Co. Ltd.; tradename: ARONIX M-325), as well as 2,2'-bis(4-acryloxydiethoxyphenyl)propane (made by Shinnakamura Kagaku Kogyo Co. Ltd.; tradename: NK ESTER A-BPE-4) and tetramethylolmethane tetraacrylate (made by Shinnakamura Kagaku Kogyo Co. Ltd.; tradename: NK ESTER A-TMMT) etc.

In the present invention, acrylic monomers and methacrylic monomers are referred to (meth)acrylic monomers.

Further, as plasticizers to be added if necessary, there may be mentioned polyvalent alcohols such as ethylene glycol, diethylene glycol, triethylene glycol, tetraethylene glycol, glycerol and trimethylolpropane; their derivatives in which terminal hydroxyl group is blocked by etherification or acetylation; polyalkylene glycols such as polyethylene glycols having a weight average molecular weight of 200–2,000, preferably 200–600 and polypropylene glycols having a weight average molecular weight of 300–2,000, preferably 300–1,000; polyester type plasticizers, for example, phthalate type plasticizers such as dimethyl phthalate (DMP), diethyl phethalate (DEP), dibutyl phthalate (DBP), heptylnonyl phthalate (HNP), di-2-ethylhexyl phthalate (DOP), di-n-octyl phthalate (DNOP), di-i-octyl phthalate (DCapP), phthalic acid (79alkyl)(D79P), di-i-decyl phthalate (DIDP), ditridecyl phthalate (DTDP), dicyclohexyl phthalate (DCHP), butylbenzyl phthalate (BDP), ethylphthalylethyl glycolate (EPEG), butylphthalylbutyl glycolate (BPBG); aliphatic dibasic acid ester type plasticizers such as di-2-ethylhexyl adipate (DOA), di-(methylcyclohexyl) adipate, diisodecyl adipate (DIDA), di-n-hexyl azelate (DNHZ), di-2-ethylhexyl azalate (DOZ), dibutyl sebacate (DBS), di-2-ethylhexyl sebacate(DOS); citrate type plasticizers such as triethyl citrate (TEC), tributyl citrate (TBC), triethyl acetylcitrate (ATEC), tributyl acetylcitrate (ATBC); epoxy type plasticizers such as epoxidized soy oil; as well as phosphate type plasticizers such as tributyl phosphate (TBP), triphenyl phosphate (TPP), tricresyl phosphate (TCP) and tripropylene glycol phosphate.

Then, as photopolymerization initiators belonging to initiators systems, there may be exemplified 1,3-di(t-butyldioxylcarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isoxazolone, 2-mercaptobenzimidazole and imidazole dimers etc. It is preferable that the photopolymerization initiator is decomposed after hologram recording from the viewpoint of stabilization of recorded hologram. For example, organic peroxide type initiators are preferable since they can be decomposed easily by ultraviolet irradiation.

As sensitizing pigments, there may be exemplified thiopyrylium salt type pigments, merocyanine type pigments, quinoline type pigments, styrylquinoline type pigments, ketocoumarine type pigments, thioxanthene type pigments, xanthene type pigments, oxonol type pigments, cyanine dyestuffs, rhodamine dystuffs, thiopyrylium salt type pigments, pyrylium ion type pigments and diphenyl iodonium ion type pigments etc, which have absorption spectra in a wavelength range of 350–600 nm. Also, sensitizing pigments having absorption spectra in a wavelength range of below 350 nm or above 600 nm may be used.

As matrix polymers, there may be mentioned polymethacrylates or their partial hydrolysates, polyvinyl acetate or its hydrolysates, polyvinyl alcohol or its partial acetylated compounds, triacetyl cellulose, polyisoprene, polybutadiene, polychloroprene, silicone rubber, polystyrene, polyvinyl butyral, polychloroprene, polyvinyl chloride, chlorinated polyethylene, chlorinated polypropylene, poly-N-vinylcarbazole or its derivatives, poly-N-vinylpyrrolidone or its derivatives, copolymer of styrene and maleic anhydride or its half esters, copolymers containing at least one of copolymerizable monomers such as acrylic acid, acrylate, methacrylic acid, methacrylate, acrylamide, acrylonitrile, ethylene, propylene, vinyl chloride and vinyl acetate as a polymerization component, or their mixtures. Preferably, there may be mentioned polyisoprene, polybutadiene, polychloroprene, polyvinyl alcohol, polyvinyl acetal which is a partially acetylated compound of polyvinyl alcohol, polyvinyl butyral, polyvinyl acetate, ethylene-vinyl acetate copolymer, vinyl chloride-vinyl acetate copolymer and their mixtures.

As a stabilizing step for recorded hologram, there may be a monomer shifting step by means of heating. For it, it is necessary that the matrix polymer has preferably a relatively low glass transition temperature for easy monomer shifting.

The photopolymerizable compound is used in a proportion of 10–1,000 parts by weight, preferably 10–100 parts by weight, to 100 parts by weight of a binder resin.

The photopolymerization initiator is used in a proportion of 1–10 parts by weight, preferably 5–10 parts by weight, to 100 parts by weight of a binder resin.

The sensitizing pigment is used in a proportion of 0.01–1 parts by weight, preferably 0.01–0.5 parts by weight, to 100 parts by weight of a binder resin.

Further, as photosensitive material components, there may be mentioned various non-ionic surfactants, cationic surfactants and anionic surfactants.

The hologram recording material is made into a coating solution with a solids content of 15%–25% by using acetone, methylethylketone, methylisobutylketone, cyclohexanone, benzene, toluene, xylene, chlorobenzene, tetrahydrofurane, methylcellosolve, ethylcellosolve, methylcellosolve acetate, ethyl cellosolve acetate, ethyl acetate, 1,4-dioxane, 1,2-dichloroethane, dichloromethane, chloroform, methanol, ethanol or isopropanol, or their mixtures. A thickness of the hologram recording layer after being dried is 0.1 $\mu$m–50 $\mu$m, preferably 5 $\mu$m–20 $\mu$m.

As such hologram materials, there may be mentioned OMNIDEX 352 and 706 made by DuPont Co. Ltd.

Then, adhesive layers 103 and 104 are explained. As adhesive layers, there may be mentioned acrylic resins, acrylate resins, or their copolymers, styrene-butadiene copolymers, natural rubbers, casein, gelatin, rosin esters, terpene resins, phenol type resins, styrene type resins, chromaneindene resins, polyvinyl ethers, silicone resins, as well as alpha-cyanoacrylate type, silicone type, maleimide type, styrene type, polyolefin type, resorsinol type, polyvinyl ether type and silicone type adhesives. Further, the adhesive layers may be formed by using so-called crosslinking type two component adhesives which are crosslinked by addition of isocyanate type crosslinking agents or metallic chelate type crosslinking agents etc. at the time of use. Further, as adhesive layers, there may be used heat-sealing agents, for example, ethylene-vinyl acetate copolymerized resins, polyamide resins, polyester resins, polyethylene resins, ethylene-isobutyl acrylate copolymerized resins, butyral resins, polyvinyl acetate and its copolymerized resins, cellulose derivatives, polymethyl methacrylate resins, polyvinyl ether resins, polyurethane resins, polycarbonate resins, polypropylene resins, epoxy resins, phenol resins, thermoplastic elastomers such as SBS, SIS, SEBS and SEPS, and reactive hot-melt type resins etc. A thickness of the adhesive layer may be 4 $\mu$m–20 $\mu$m.

The volume hologram laminate according to the invention is characterized in that a (meth) acrylic monomer is added in at least one of the adhesive layers 103 and 104. As (meth) acrylic monomers, those having a low molecular weight of 100–5,000, particularly 100–2,000, may be used. If the molecular weight being lower than 100, those become volatile, which is not preferable. If the molecular weight is above 5,000, shifting to the adjacent layer is decreased, by which the object of adding may not be attained.

As (meth)acrylic monomers, there may be mentioned acrylic monomers and methacrylic monomers described for the volume hologram layer. Preferably, methoxypolyethylene glycol methacrylate (weight average molecular weight: 400), methoxydiethylene glycol (meth)acrylate, polyethylene glycol dimethacrylate (weight average molecular weight: 200) and trimethylolpropane tri(meth)acrylate may be exemplified.

As (meth)acrylic monomers, it is preferable to select the substance compatible with constituting components of the volume hologram layer. Further, it is required not to destroy completely the recorded interference stripes by shifting into the volume hologram layer. Also, it is required not to make reproduction of recording impossible.

The (meth)acrylic monomer is dissolved and dispersed in an organic solvent. After coating it on a delaminating paper and drying, an adhesive layer is obtained. The substance may be added in the adhesive layer in an amount of 2%–20% by weight, preferably 5%–15% by weight. If it is higher than 20% by weight, it is not preferable since it hinders an adhesive property.

In the present invention, if the adhesive layer wherein (meth)acrylic monomer being added is laminated on the volume hologram layer, (meth)acrylic monomer is shifted to the holographically recorded volume hologram layer and swells the volume hologram layer. Although the detailed reason therefor is not clear, the obtained reproduced wavelength can be shifted to a long wavelength side. Thus, it can be controlled to a desirable reproduced wavelength under a bright line of an illuminating light origin.

The relationships between the content of the substance for shifting recorded wavelength and reproduced wavelength in the volume hologram layer may be determined by the following experimental methods.

(Dependency of a Shifted Wavelength Amount on an Added Amount of a Photopolymerizable Compound)

A hologram recording film: a PET film/a volume hologram layer/a polyvinyl chloride film (made by DuPont Co. Ltd.; Omnidex 706)

An adhesive film: the following composition

Adhesives having various trimethylolpropane triacrylate (TMPTA) concentrations were prepared by adding varied amounts of TMPTA on the following composition:

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight. |

The adhesives were coated on PET films at a dry film thickness of 15 $\mu$m, to prepare respective adhesive films.

At first, recording was carried out holographically on the hologram recording film by means of an argon laser having a specified wavelength of 488 nm. Thereafter, its polyvinyl chloride film was delaminated and the adhesive film was adhered on the hologram surface from the adhesive layer side.

The obtained PET film/the volume hologram layer/the adhesive layer/the PET film laminates were baked at 140° C. for 15 minutes, which were the conditions in the actual processing procedure. Thereafter, spectral transparency was measured by using UV-2100PC made by Shimazu Seisakusho. A peak wavelength was determined and then a shifted amount from the recorded wavelength of 488 nm (peak wavelength−488 nm=Δλ) was calculated.

Figure 11:
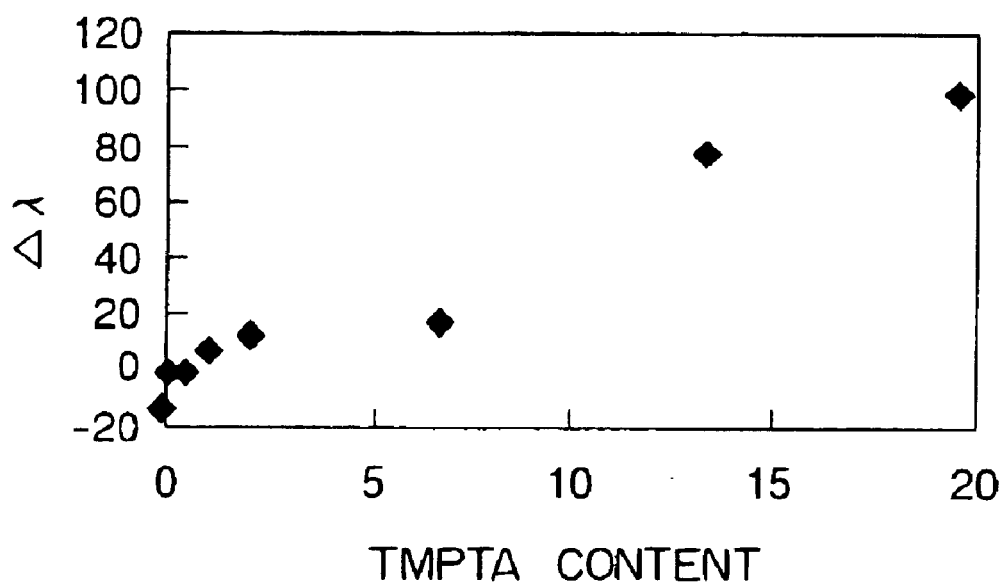

The measured results are shown in FIG. 11 in which an unit of TMPTA concentration is expressed in 10−4 mol, which is an added amount per 1g of an acrylic adhesive. As shown in FIG. 11, for the case in which the added amount of TMPTA in the adhesive layer is 0, Δλ is negative. Therefore, it is seen that unreacted monomers and plasticizers etc. were shifted from the volume hologram layer to the adhesive layer and the volume hologram layer was contracted to shift the reproduced wavelength to a short wavelength side. Further, if the added amount of TMPTA being increased, Δλ is increased to shift the reproduced wavelength to a long wavelength side.

Further, in the present invention, if the adhesive layer wherein (meth)acrylic monomer being added is laminated on the volume hologram layer, it was found that the reproduced wavelength can be controlled and the reproduced wavelength band can be enlarged, although the detailed reason therefor is not clear. That is, the volume hologram laminate according to the invention can be corresponded to the bright line of the illuminating light origin even though it has a narrow wavelength range. Thus, a clear hologram can be obtained steadily.

Further, in the volume hologram laminate according to the invention, a content of the shifting components added in the first adhesive layer and/or the second adhesive layer is balanced with the content in the volume hologram layer, thus shifting components other than (meth)acrylic monomer are not occurred between both the adhesive layers and the volume hologram layer. Thereby, the reproduced wavelength can become more stable.

As these shifting components, there may be mentioned photopolymerizable compounds and plasticizers described above as the constituting materials in the volume hologram layer. However, if (meth)acrylic monomer is selected as the shifting component, it may be added with consideration of the added amount of the above-mentioned one for (meth) acrylic monomer.

Further, there may be mentioned tackifiers, surfactants and polyalkylene glycol etc. as the shifting components. Those having a low molecular weight of 100–5,000, particularly 100–2,000, are preferably used. If the molecular weight is lower than 100, those may become volatile which is not preferable. Also, if the molecular weight is higher than 5,000, the shifting property is decreased, and the object for addition may not be attained. Further, as the substance for shifting recorded wavelength contained in the adhesive layer, it is preferable to select a substance having compatibility with the constituting components of the volume hologram layer. Also, the substance is required not to shift and destroy completely the recorded interference stripes or not to make reproduction of recording impossible.

In addition, the shifting component, i.e. (meth)acrylic monomer, contained in the adhesive layer may be contained in the adhesive layer in an amount not to lose its adhesive property, such as 20% by weight or less. However, its content is appropriately set depending on the relationship with an amount of the shifting component in the volume hologram layer and on the relationship with desirable reproduced wavelength.

Next, the surface protecting film 106 in the volume hologram laminate according to the invention has a transparent property. There may be exemplified polyethylene film, polypropylene film, polyethylene fluoride type film, polyvinylidene fluoride film, polyvinyl chloride film, polyvinylidene chloride film, ethylene-vinyl alcohol film, polyvinyl alcohol film, polymethyl methacrylate film, polyether sulfone film, polyether ether ketone film, polyamide film, tetrafluoroethylene-perfluoroalkylvinyl ether copolymer film, polyester films such as polyethylene teraphthalate film and polyimide film etc. A film thickness is 2 μm–200 μm, preferably 10 μm–50 μm.

In the case that the volume hologram layer has an adhesive property in the volume hologram laminate, the adhesive layer, the volume hologram layer and the surface protecting film are arranged on the substrate in the described order. In the surface protecting film, a plasticizer is generally contained. In this case, the balance of the shifting component may be adjusted between the adhesive layer, the volume hologram layer and the surface protecting film respectively.

Although not shown in the drawings, the surface protecting film may be subjected to hard-coating treatment if necessary with an object to increase the protecting property of the surface protecting film. Hard-coating treatment may be carried out by coating silicone type, fluorine-containing silicone type, melamine alkyd type and urethane-acrylate type (ultraviolet curable type) agents by means of a dip coating, a spray coating or a roll coating to a film thickness of 1 μm–50 μm, preferably 3 μm–25 μm.

Further, although not shown in the drawings, a releasing treatment may be carried out on the surface or the hard-coated surface of the surface protective film 106. The releasing treatment may be carried out by dip coating, a spray coating or a roll coating of a fluorine type releasing agent, a silicone type releasing agent, a stearate type releasing agent or wax type releasing agent etc.

The volume hologram layer in the volume hologram laminate according to the invention may be recorded holographically by using a single recording wavelength or color-recorded holographically by using two or more wavelengths. Further, the reproduced wavelength can be shifted to the recorded wavelength by adding (meth)acrylic monomer in the adhesive layer.

In the case of hologram recording at a single wavelength, a half-width value of the obtained reproduced wavelength range can be set at 30 nm or more, preferably 35 nm or more. Also, in the case of color hologram recording at two or more wavelengths, a half-width value of the obtained reproduced wavelength range can be set at 20 nm or more, preferably 25 nm or more.

By the volume hologram laminate according to the invention, the reproduced wavelength can be adjusted with the bright line wavelength of the illuminating light origin and also can be controlled. Thus, the reproduced band can be enlarged. Therefore, clear hologram image can be reproduced under the illuminating light origin.

Then, as to a label for preparation of a volume hologram laminate according to the invention, the cross-sectional laminar constitution is shown in FIG. 9. In the drawing, reference numeral 90 denotes a label for preparation of a volume hologram laminate, and reference numeral 91 denotes a delaminating paper.

The label for preparation of a volume hologram laminate according to the invention is used for preparation of the above-mentioned volume hologram laminates. As shown in FIG. 9, a first adhesive layer 93, a volume hologram layer 95, a second adhesive layer 94 and a surface protecting film 96 are laminated on a delaminating paper 91.

As the delaminating paper 91, there may be used delaminating film which is subjected to a delaminating treatment by means of a fluorine type delaminating agent or a silicone type delaminating agent on a surface of a polyethylene terephthalate film, in addition to the conventionally used delaminating papers. Further, also on a surface not in the adhesive layer side of the delaminating paper, a delaminating treatment may be carried out in order to avoid blocking due to an adhesive bled out from the label side. Further, in order to delaminate the laminate from the delaminating paper in an appropriate size, the laminate may be subjected to a so-called half-cutting process, or the delaminating paper may have cutting parts such as perforations.

A label 90 is laminated on a substrate from a first adhesive layer 93 side after delamination of a delamination paper 91, to prepare volume hologram laminates according to the first to the fourth aspects shown in FIG. 10.

EXAMPLE A

The first invention is explained by the following examples.

Example A1

(Preparation of a Transparent Film/a Second Adhesive Layer/a Silicone Separator (Release Liner)

On a silicone separator (made by Tokyo Cellophane Co. Ltd.; SP-PEO5; a film thickness of 50 μm), a solution of an adhesive having the following composition was coated to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| isocyanate crosslinking agent (made by Nippon Carbide Co. Ltd.; Nissetsu CK-101) | 2 parts by weight. |

Polyethylene terephthalate film (made by Toray Co. Ltd.; Lumilar-T-60; a film thickness of 50 μm) was laminated on it.

(Preparation of a Silicone Separator A/a First Adhesive Layer/a Silicone Separator B)

On a silicone separator A (made by Tokyo Cellophane Co. Ltd.; SP-PETO5; a film thickness of 50 μm), a solution of an adhesive having the following composition was coated to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| trimethylolpropane triacrylate | 3 parts by weight. |

A silicone separator B (made by Tokyo Cellophane Co. Ltd.; SP-PETO2; a film thickness of 50 μm) was laminated on it.

(Preparation of a Hologram Recording Film)

A Lippmann hologram was recorded on a hologram recording film (OMNIDEX 706M; made by DuPont Co. Ltd.) comprising a laminate of a polyethylene terephthalate film (PET film: 50 μm)/a hologram recording material/a polyvinyl chloride film by means of 488 nm argon laser.

(Preparation of a Hologram Laminate)

The polyvinyl chloride film was delaminated from the hologram recording film obtained as above. The silicone separator A was also delaminated from the silicone separator A/the first adhesive layer/the silicone separator B obtained as above. Both were laminated/to obtain the PET film/the hologram recording material/the first adhesive layer/the silicone separator B.

The PET film was delaminated from the laminate. The silicone separator was delaminated from the transparent film/the second adhesive layer/the silicone separator obtained as above. Both were laminated/to obtain a volume hologram laminate label according to the present invention comprising the transparent protecting film/the second adhesive layer/the hologram recording material/the first adhesive layer/silicone separator B.

The label was heated at 140° C. for 15 minutes and evaluated for its spectral characteristics. There were found that its reproduced wavelength was 487 nm, that Δλ from the recorded wavelength was −1 nm, and that their agreement was superior.

Example A2

A volume hologram laminate according to the invention was obtained similar to Example A1 except for the following points. The silicone separator A/the first adhesive layer/the silicone separator B in Example A1 were substituted with those obtained by coating a solution of an adhesive having the following composition on a silicone separator A (made by Tokyo Cellophane Co. Ltd.; SP-PETO5; a film thickness of 50 μm) to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| dibutyl phthalate | 3 parts by weight. |

Silicone separator B (made by Tokyo Cellophane Co. Ltd.; SP-PETO2; a film thickness of 50 μm) was laminated on it. Further, a Lippmann hologram was recorded by means of 514 nm argon laser on a hologram recording film (OMNIDEX 706M; made by DuPont Co. Ltd.) comprising a laminate of a polyethylene terephthalate film (PET film: 50 μm)/a hologram recording material/a polyvinyl chloride film as a hologram recording film.

The label was heated at 140° C. for 15 minutes and evaluated for its spectral characteristics. There were found that its reproduced wavelength was 510 nm, that Δλ from the recorded wavelength was −4 nm, and that their agreement was superior.

Example A3

A volume hologram laminate according to the invention was obtained similar to Example A1 except for the following points. The silicone separator A/the first adhesive layer/the silicone separator B in Example A1 were substituted with those obtained by coating a solution of an adhesive having the following composition on a silicone separator A (made by Tokyo Cellophane Co. Ltd.; SP-PET05; a film thickness of 50 μm) to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| terpene phenol resin (made by Yasuhara Chemical Co. Ltd.; YS POLYSTAR T-80) | 4 parts by weight. |

Silicone separator B (made by Tokyo Cellophane Co. Ltd.; SP-PETO2; a film thickness of 50 μm) was laminated on it. The label was heated at 140° C. for 15 minutes and evaluated for its spectral characteristics. There were found that its reproduced wavelength was 490 nm, that Δλ from the recorded wavelength was +2 nm, and that their agreement was superior.

Example A4

A volume hologram laminate according to the invention was obtained similar to Example A1 except for the following points. The silicone separator A/the first adhesive layer/the silicone separator B in Example A1 were substituted with those obtained by coating a solution of an adhesive having the following composition on a silicone separator A (made by Tokyo Cellophane Co. Ltd.; SP-PETO5; a film thickness of 50 μm) to a dry film thickness of 15 μm by means of a comma coater;

| | |
|---|---|
| acrylic adhesive (made by Nippon Carbide Co. Ltd.; Nissetsu PE-118) | 110 parts by weight |
| methylethylketone | 30 parts by weight |
| toluene | 15 parts by weight |
| ethyl acetate | 15 parts by weight |
| non-ionic surfactant (made by Kao Co. Ltd.; REODOL tw-S320) | 3.5 parts by weight. |

Silicone separator B (made by Tokyo Cellophane Co. Ltd.; SP-PETO2; a film thickness of 5m) was laminated on it. Further, a Lippmann hologram was recorded by means of 514 nm argon laser on a hologram recording film (OMNIDEX 706M; made by DuPont Co. Ltd.) comprising a laminate of a polyethylene terephthalate film (PET film: 50 μm)/a hologram recording material a polyvinyl chloride film as a hologram recording film.

The label was heated at 140° C. for 15 minutes and evaluated for its spectral characteristics. There were found that its reproduced wavelength was 512 nm, that Δλ from the recorded wavelength was −2 nm, and that their agreement was superior.

Example A5

A volume hologram laminate according to the invention was obtained similar to Example A1 except for the following points. The silicone separator A/the first adhesive layer/the silicone separator B in Example A1 were substituted with those obtained by coating a solution of an adhesive having the following composition on a silicone separator A (made by Tokyo Cellophane Co. Ltd.; SP-PETO5; a film thickness of 50 μm) to a dry film thickness of 15 μm by means of a comma coater;

| | |
|---|---|
| acrylic adhesive (made by Nippon Carbide Co. Ltd.; Nissetsu PE-118) | 110 parts by weight |
| methylethylketone | 30 parts by weight |
| toluene | 15 parts by weight |
| ethyl acetate | 15 parts by weight |
| polyethylene glycol (made by Junsei Kagaku Co. Ltd.; POLYETHYLENE GLYCOL 400; weight average molecular weight: 400) | 5 parts by weight. |

Silicone separator B (made by Tokyo Cellophane Co. Ltd.; SP-PETO2; a film thickness of 50 μm) was laminated on it. The label was heated at 140° C. for 15 minutes and evaluated for its spectral characteristics. There were found that its reproduced wavelength was 487 nm, that Δλ from the recorded wavelength was −1 nm, and that their agreement was superior.

Example A6

A volume hologram laminate according to the invention was obtained similar to Example A1 except for the following points. The silicone separator A/the first adhesive layer/the silicone separator B in Example A1 were substituted with those obtained by coating a solution of an adhesive having the following composition on a silicone separator A (made by Tokyo Cellophane Co. Ltd.; SP-PETO5; a film thickness of 50 μm) to a dry film thickness of 15 μm by means of a comma coater;

| | |
|---|---|
| acrylic adhesive (made by Nippon Carbide Co. Ltd.; Nissetsu PE-118) | 110 parts by weight |
| methylethylketone | 30 parts by weight |
| toluene | 15 parts by weight |
| ethyl acetate | 15 parts by weight |
| polypropylene glycol (made by Junsei Kagaku Co. Ltd.; POLYPRROPYLENE GLYCOL 400; weight average molecular weight: 400) | 3 parts by weight. |

Silicone separator B (made by Tokyo Cellophane Co. Ltd.; SP-PETO2; a film thickness of 50 μm) was laminated on it. The label was heated at 140° C. for 15 minutes and evaluated for its spectral characteristics. There were found that its reproduced wavelength was 489 nm, that Δλ from the recorded wavelength was +1 nm, and that their agreement was superior.

Example A7

A full-color Lippmann hologram was recorded on a hologram recording film (HRF800x001; made by DuPont Co. Ltd.) comprising a laminate of a PET film/a hologram recording material/a PET film instead of the hologram recording film in Example A1 by means of three lasers having respective wavelengths of 476 nm, 532 nm and 647 nm.

The obtained hologram recording film was used similar to Example A1, to obtain a volume hologram laminate label according to the present invention which comprises the transparent protecting film/the second adhesive layer/the hologram recording material/the first adhesive layer/silicone separator B.

The label was heated at 140° C. for 15 minutes and evaluated for its spectral characteristics. There were found that reproduced wavelengths were 474 nm, 535 nm and 642 nm, and that their agreement was superior.

Example A8

(Preparation of a Hologram Recording Film)

A Lippmann hologram was recorded on a hologram recording film (OMNIDEX 706M; made by DuPont Co. Ltd.) comprising a laminate of a PET film/a hologram recording material/a polyvinyl chloride film by means of 488 nm argon laser.

(Preparation of a Hologram Laminate)

The polyvinyl chloride film was delaminated from the hologram recording film obtained as above. The one separator was also delaminated from of an acrylic both-side adhesive sheet (made by Nitto Denko Co. Ltd.; MC2070) comprising a separator/an adhesive layer/a PET film/an adhesive layer/a separator. Both were laminated/to obtain the PET film/the hologram recording material/the adhesive layer/the PET film/the adhesive layer/the separator.

The PET film was delaminated from the said laminate. The laminate was laminated on an acrylic adhesive film (made by Lintec Co. Ltd.; FUJICLEAR 50PL SHIN) comprising a PET film/an adhesive layer/to obtain a volume hologram laminate label according to the present invention which comprises the PET film/the second adhesive layer/the hologram recording material/the first adhesive layer/the PET film/the adhesive layer/the silicone separator.

The label was heated at 140° C. for 15 minutes and evaluated for its spectral characteristics. There were found that its reproduced wavelength was 490 nm and that their agreement was superior.

Example A9

In order to obtain reproduced wavelengths of 550 nm (green) and 610 nm (red) in a volume hologram laminate, the following volume hologram laminate was prepared.

(Preparation of a PET Film/a First Adhesive Layer/a Silicone Separator)

On a silicone separator (made by Tokyo Cellophane Co. Ltd.; SP-PEO5; a film thickness of 50 μm), a solution of an adhesive having the following composition was coated immediately to a dry film thickness of 15 μm by means of a comma coater;

| | |
|---|---|
| acrylic adhesive (made by Nippon Carbide Co. Ltd.; Nissetsu PE-118) | 110 parts by weight |
| methylethylketone | 30 parts by weight |
| toluene | 15 parts by weight |
| ethyl acetate | 15 parts by weight |
| isocyanate crosslinking agent (made by Nippon Carbide Co. Ltd.; Nissetsu K-101) | 16 parts by weight. |

Polyethylene terephthalate film (made by Toray Co. Ltd.; Lumilar-T-60; a film thickness of 50 μm) was laminated on it. (Preparation of a silicone separator A/a second adhesive layer/a silicone separator B)

On a silicone separator A (made by Tokyo Cellophane Co. Ltd.; SP-PETO5; a film thickness of 50 μm), a solution of an adhesive having the following composition was coated immediately to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |

-continued

| | |
|---|---|
| ethyl acetate | 15 parts by weight |
| trimehylolpropane triacrylate | 12 parts by weight. |

A silicone separator B (made by Tokyo Cellophane Co. Ltd.; SP-PETO2; a film thickness of 50 μm) was laminated on it.

(Preparation of a Hologram Recording Film)

A Lippmann hologram was recorded on a hologram recording film (OMNIDEX 706M; made by DuPont Co. Ltd.) comprising a laminate of a polyethylene terephthalate film (PET film: 50 μm)/a hologram recording material/a PET film by means of 458 nm and 514 nm argon lasers.

(Preparation of a Hologram Laminate)

One PET film was delaminated from a laminate of a PET film/a film for shifting recorded wavelength/a PET film. The other PET film was also delaminated from the hologram recording film obtained as above. Both were laminated, to obtain the PET film/the film for shifting recorded wavelength/the hologram layer/the the PET film layer, which were heated at 100° C. for 15 minutes.

Then, the PET film at the hologram layer side was delaminated. The silicone separator A was delaminated from the silicone separator A/the second adhesive layer/the silicone separator B obtained as above. Both were laminated and thereafter the PET film at the film for shifting recorded wavelength was delaminated. The silicone separator was delaminated from the PET film/the first adhesive layer/the silicone separator obtained above. Both was laminated, to obtain a volume hologram laminate label according to the present invention comprising the PET film/the first adhesive layer/the film for shifting recorded wavelength/the the hologram layer/the second adhesive layer/the silicone separator B.

The label was left at the room temperature for 24 hours and evaluated for its spectral characteristics. There were found that reproduced wavelengths were 552 nm and 613 nm, and that they are almost agreed with desirable reproduced wavelengths.

Example A10

In order to obtain a reproduced wavelength of 550 nm (green) in a volume hologram laminate, the following volume hologram laminate was prepared.

A volume hologram laminate label was prepared similar to Example A9 except that a Lippman hologram was recorded on a hologram recording film (OMNIDEX 706M; made by DuPont Co. Ltd.) comprising a laminate of a polyethylene terephthalate film (PET film: 50 μm)/a hologram recording material/a PET film by means of 514 nm argon laser.

The label was left at the room temperature for 24 hours and evaluated for its spectral characteristics. There were found that its reproduced wavelength was 553 nm, and that it ia almost agreed with desirable reproduced wavelength.

Comparative Example A

A transparent protecting film/a second adhesive layer/a silicone separator were prepared similar to Example A1.

(Preparation of a Silicone Separator A/a First Adhesive Layer/a Silicone Separator B)

The silicone separator A/the first adhesive layer/the silicone separator B in Example A1 were altered in that TMPTA was not contained in the first adhesive layer in a coating solution. The solution was coated on the silicone separator A to a dry film thickness of 15 μm by means of a comma coater. A silicone separator B (made by Tokyo cellophane Co. Ltd.; SP-PETO2; a film thickness of 50 μm) was laminated on it, to obtain a laminate.

Other operations were carried out similar to Example A1; a volume hologram laminate label comprising a transparent protecting film/a second adhesive layer/a hologram recording material/a first adhesive layer/a silicone separator B was obtained.

The label was heated at 140° C. for 15 minutes and evaluated for its spectral characteristics. There were found that its reproduced wavelength was 462 nm, which was much deviated from the recorded wavelength.

Thus, for the volume hologram laminate and the label for preparation of the volume hologram laminate according to the invention, a difference between the recorded color tone and the color tones of image information reproduced actually from hologram can be made less and the reproduced wavelength can be controlled to the desirable one.

EXAMPLE B

Example B1

(Preparation of a Transparent Protecting Film/a Second Adhesive Layer/a Silicone Separator)

On a silicone separator (made by Tokyo Cellophane Co. Ltd.; SP-PETO5; a film thickness of 50 μm), a solution of an adhesive having the following composition was coated immediately to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| isocyanate crosslinking agent (made by Nippon Carbide Co. Ltd.; Nissetsu CK-101) | 16 parts by weight. |

Polyethylene terephthalate film (made by Toray Co. Ltd.; Lumilar-T-60; a film thickness of 50 μm) was laminated on it.

(Preparation of a Silicone Separator A/a First Adhesive Layer/a Silicone Separator B)

On a silicone separator A (made by Tokyo Cellophane Co. Ltd.; SP-PETO5; a film thickness of 50 μm), a solution of an adhesive having the following composition was coated immediately to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| silicone oil (made by Shinetsu Kagaku Co. Ltd.; KF-858; refractive index: 1.394) | 3 parts by weight. |

A silicone separator B (made by Tokyo Cellophane Co. Ltd.; SP-PETO2; a film thickness of 50 μm) was laminated on it.

(Preparation of a Hologram Recording Film)

A Lippmann hologram was recorded on a hologram recording film (OMNIDEX 706; made by DuPont Co. Ltd.) comprising a laminate of a polyethylene terephthalate film (PET film: 50 μm)/a hologram recording material (refractive index: 1.522)/a polyvinyl chloride film by means of 514 nm argon laser.

(Preparation of a Hologram Laminate)

The polyvinyl chloride film was delaminated from the hologram recording film obtained as above. The silicone separator A was also delaminated from the silicone separator A/the first adhesive layer/the silicone separator B obtained as above. Both were laminated, to obtain the PET film/the hologram recording material/the first adhesive layer/the silicone separator B.

The PET film was also delaminated from the said laminate. The silicone separator was delaminated from the transparent protecting film/the second adhesive layer/the silicone separator obtained as above. Both were laminated, to obtain a volume hologram laminate label according to the present invention comprising the transparent protecting film/the second adhesive layer/the hologram recording material/the first adhesive layer/silicone separator B.

The label was heated at 140° C. for 15 minutes and evaluated for its spectral characteristics. There were found that its reproduced wavelength was 455 nm, that Δλ from the recorded wavelength was −59 nm, and that it shifted much to blue region wavelength.

The silicone separator B was delaminated from the label and adhered on a black solid printing substrate. A clear hologram image could be reproduced, which was confirmed by observation with an illumination light origin at a blue bright line wavelength of 460 nm.

Example B2

(Preparation of a Transparent Protecting Film a Second Adhesive Layer/a Silicone Separator)

On a silicone separator (made by Tokyo Cellophane Co. Ltd.; SP-PETO5; a film thickness of 50 μm), a solution of an adhesive having the following composition was coated immediately to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| isocyanate crosslinking agent (made by Nippon Carbide Co. Ltd.; Nissetsu CK-101) | 16 parts by weight. |

Polyethylene terephthalate film (made by Toray Co. Ltd.; Lumilar-T-60; a film thickness of 50 μm) was laminated on it.

(Preparation of a Silicone Separator A/a First Adhesive Layer/a Silicone Separator B)

On a silicone separator (made by Tokyo Cellophane Co. Ltd.; SP-PETO5; a film thickness of 50 μm), a solution of an adhesive having the following composition was coated immediately to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| 1-bromonaphthalene (made by Junsei Chenical Co., Ltd., refractive index: 1.6576) | 7 parts by weight. |

A silicone separator B (made by Tokyo Cellophane Co. Ltd.; SP-PET02; a film thickness of 50 μm) was laminated on it.

(Preparation of a Hologram Recording Film)

A Lippmann hologram was recorded on a hologram recording film (OMNIDEX 706M; made by DuPont Co. Ltd.) comprising a laminate of a polyethylene terephthalate film/a hologram recording material layer (refractive index: 1.522)/a PET by means of 488 nm argon laser.

(Preparation of a Hologram Laminate)

One of the PET films was delaminated from the hologram recording film obtained as above. The silicone separator A was also delaminated from the silicone separator A/the first adhesive layer/the silicone separator B obtained as above. Both were laminated, to obtain the PET film/the hologram recording material/the first adhesive layer/the silicone separator B.

The PET film was also delaminated from the said laminate. The silicone separator was delaminated from the transparent film/the second adhesive layer/the silicone separator obtained as above. Both were laminated, to obtain a volume hologram laminate label according to the present invention comprising the transparent protecting film/the second adhesive layer/the hologram recording layer/the first adhesive layer/the silicone separator B.

The label was heated at 140° C. for 15 minutes and evaluated for its spectral characteristics. There were found that its reproduced wavelength was 558 nm, that Δλ from the recorded wavelength was +70 nm, and that it shifted much to red region wavelength.

The silicone separator B was delaminated from the label and adhered on a black solid printing substrate. A clear hologram image could be reproduced, which was confirmed by observation with an illumination light origin at a green bright line wavelength of 560 nm.

Comparative Example B1

A label for preparation of a volume hologram laminate was prepared similar to Example B1 except that silicone oil (made by Shinetsu Kagaku Kogyo Co. Ltd.; KF-858; refractive index: 1.394) was omitted. The label was evaluated for its spectral characteristics similarly. There was found that its reproduced wavelength was 472 nm.

Comparative Example B2

A label for preparation of a volume hologram laminate was prepared similar to Example B2 except that 1-bromonaphthalene was omitted. The label was evaluated for its spectral characteristics similarly. There was found that its reproduced wavelength was 452 nm.

As described above, by means of the volume hologram laminate and the label for preparation of the volume hologram laminate according to the invention, a shifted amount of a reproduced wavelength from a recorded wavelength can be controlled and a desirable reproduced wavelength can be obtained.

EXAMPLE C

The examples of the third invention are explained as follows.

Example C1

(Preparation of a Transparent Protecting Film/a Second Adhesive Layer/a Silicone Separator)

On a silicone separator (made by Tokyo Cellophane Co. Ltd.; SP-PETO5; a film thickness of 50 μm), a solution of an adhesive having the following composition was coated immediately to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| isocyanate crosslinking agent (made by Nippon Carbide Co. Ltd.; Nissetsu K-101) | 16 parts by weight. |

Polyethylene terephthalate film (made by Toray Co. Ltd.; Lumilar-T-60; a film thickness of 50 μm) was laminated on it.

(Preparation of a Silicone Separator A/a First Adhesive Layer/a Silicone Separator B)

On a silicone separator A (made by Tokyo Cellophane Co. Ltd.; SP-PETO5; a film thickness of 50 μm), a solution of an adhesive having the following composition was coated immediately to a dry film thickness of 15 μm by means of a comma coater;

| | |
|---|---|
| acrylic adhesive (made by Nippon Carbide Co. Ltd.; Nissetsu PE-118) | 100 parts by weight |
| methylethylketone | 30 parts by weight |
| toluene | 15 parts by weight |
| ethyl acetate | 15 parts by weight |
| methoxypolyethylene glycol methacrylate (weight average molecular weight: 400; made by Shin Nakamura Kagaku Kogyo Co. Ltd.) | 10 parts by weight. |

A silicone separator B (made by Tokyo Cellophane Co. Ltd.; SP-PET02; a film thickness of 50 μm) was laminated on it.

(Preparation of a Hologram Recording Film)

A Lippmann hologram was recorded on a hologram recording film (OMNIDEX 706M; made by DuPont Co. Ltd.) comprising a laminate of a polyethylene terephthalate film (PET film: 50 μm)/a hologram recording material/a polyvinyl chloride film by means of 488 nm argon laser.

(Preparation of a Hologram Laminate)

The polyvinyl chloride film was delaminated from the hologram recording film obtained as above. The silicone separator A was also delaminated from the silicone separator A/the first adhesive layer/the silicone separator B obtained as above. Both were laminated, to obtain the PET film/the volume hologram layer/the first adhesive layer/the silicone separator B.

The PET film was delaminated from the said laminate. The silicone separator was also delaminated from the transparent protecting film/the second adhesive layer/the silicone separator obtained as above. Both were laminated, to obtain a volume hologram laminate label according to the present invention comprising the transparent protecting film/the second adhesive layer/the hologram recording material/the first adhesive layer/silicone separator B.

The label was heated at 140° C. for 15 minutes and evaluated for its spectral characteristics. There were found that its reproduced wavelength was 498 nm, that Δλ from the recorded wavelength was +10 nm, and that its half width was 43 nm.

Comparative Example C

A label for preparation of a volume hologram laminate was prepared similar to Example C1 except that methoxypolyethylene glycol methacrylate was omitted. The label was evaluated for its spectral characteristics similarly. There were found that its reproduced wavelength was 472 nm and that its half width was 26 nm.

Example C2

A color Lippmann hologram was recorded on a hologram recording film (HRF800x001; made by DuPont Co. Ltd.) comprising a PET film/a hologram recording material/a PET film instead of the hologram recording film in Example C1 by using three lasers having respective wavelengths of 476 nm, 532 nm and 647 nm.

The obtained hologram recording film was used similar to Example C1/to obtain a volume hologram laminate label comprising a transparent protecting film/a second adhesive layer/a hologram recording material/a first adhesive layer/silicone separator B.

The label was heated at 140° C. for 15 minutes and evaluated for its spectral characteristics. There were found that its reproduced wavelengths were 487 nm, 544 nm and 655 nm respectively, $\Delta\lambda$ from the recorded wavelength were +12 nm, +12 nm, and +8 nm, respectively, and that half widths thereof were 21 nm, 23 nm and 27 nm, respectively.

As seen from the above-mentioned Examples, by the volume hologram laminate and the label for preparation of the volume hologram laminate according to the invention, a desirable reproduced wavelength can be controlled and a reproduced band can be enlarged. Thus, a clear hologram image can be reproduced under an illuminating light origin.

What is claimed is:

1. A volume hologram laminate having a first adhesive layer, a volume hologram layer, a second adhesive layer and a surface protecting film formed on a substrate in the described order, wherein a substance for shifting a recorded wavelength to the volume hologram layer is contained in the first and/or the second adhesive layer(s), a reproduced wavelength of hologram recorded in the volume hologram layer is controlled with shifting the substance between the layers, the substance being a tackifier having a molecular weight of 100 to 5,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

2. A volume hologram laminate according to claim 1, wherein the first and/or second adhesive layer (s) is a crosslinking two component adhesive that is crosslinked at the time of use by addition of a crosslinking agent.

3. A volume hologram laminate according to claim 1, wherein the volume hologram layer comprises a photopolymerizable compound and the layer is recorded holographically.

4. A volume hologram laminate having a first adhesive layer, a volume hologram layer, a second adhesive layer and a surface protecting film formed on a substrate in the described order, wherein a substance for shifting a recorded wavelength to the volume hologram layer is contained in either one of the first and the second adhesive layers, the substance is not contained in the other adhesive layer, a reproduced wavelength of hologram recorded in the volume hologram layer is controlled with shifting the substance between the layers, the substance being a tackifier having a molecular weight of 100 to 5,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

5. A volume hologram laminate having a first adhesive layer, a volume hologram layer, a second adhesive layer and a surface protecting film formed on a substrate in the described order, wherein a film for shifting a recorded wavelength is put between the first adhesive layer and the volume hologram layer or between the second adhesive layer and the volume hologram layer, a substance for shifting a recorded wavelength to the volume hologram layer is contained in one of the adhesive layers without the film, a reproduced wavelength of hologram recorded in the volume hologram layer is controlled with shifting the substance between the respective adhesive layer and the film as well as between the adhesive layer and the volume hologram layer, the substance being a tackifier having a molecular weight of 100 to 5,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

6. A label for preparation of a volume hologram laminate having a first adhesive layer, a volume hologram layer, a second adhesive layer and a surface protecting film formed on a release liner sheet in the described order, wherein a substance for shifting a recorded wavelength to the volume hologram layer is contained in the first and/or the second adhesive layer(s), a reproduced wavelength of hologram recorded in the volume hologram layer is controlled with shifting the substance between the layers, the substance being a tackifier having a molecular weight of 100 to 5,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

7. A label for preparation of a volume hologram laminate having a first adhesive layer, a volume hologram layer, a second adhesive layer and a surface protecting film formed on a release liner sheet in the described order, wherein substance for shifting a recorded wavelength to the volume hologram layer is contained in either one of the first and the second adhesive layers, the substance is not contained in the other adhesive layer, a reproduced wavelength of hologram recorded in the volume hologram layer is controlled with shifting the substance between the layers, the substance being a tackifier having a molecular weight of 100 to 5,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

8. A label for preparation of a volume hologram laminate having a first adhesive layer, a volume hologram layer, a second adhesive layer and a surface protecting film formed on a release liner sheet in the described order, wherein a film for shifting a recorded wavelength is put between the first adhesive layer and the volume hologram layer or between the second adhesive layer and the volume hologram layer, a substance for shifting a recorded wavelength to the volume hologram layer is contained in one of the adhesive layers without the film, a reproduced wavelength of hologram recorded in the volume hologram layer is controlled with shifting the substance between the respective adhesive layer and the film as well as between the adhesive layer and the volume hologram layer, the substance being a tackifier having a molecular weight of 100 to 5,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

9. A volume hologram laminate having a first adhesive layer, a volume hologram layer, a second adhesive layer and a surface protecting film formed on a substrate in the described order, wherein a substance with a refractive index lower than that of the volume hologram layer for shifting a recorded wavelength is contained in the first and/or the second adhesive layer(s), a reproduced wavelength of hologram recorded in the volume hologram layer is shifted to a short wavelength side, the substance being a tackifier having a molecular weight of 100 to 5,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

10. A volume hologram laminate according to claim 9, wherein the refractive index of the substance for shifting a recorded wavelength is at least 0.1 at 25° C. lower than that of the volume hologram layer.

11. A volume hologram laminate according to claim 9, wherein the first and/or second adhesive layer(s) is formed of a crosslinking type two component adhesive that is crosslinked at the time of use by addition of a crosslinking agent.

12. A volume hologram laminate according to claim 9, wherein a volume hologram layer comprises a photopolymerizable compound and the layer is recorded holographically.

13. A volume hologram laminate having a first adhesive layer, a volume hologram layer, a second adhesive layer and a surface protecting film formed on a substrate in the described order, wherein a substance with a refractive index higher than that of the volume hologram layer for shifting a recorded wavelength is contained in the first and/or second adhesive layer(s), a reproduced wavelength of hologram recorded in the volume hologram layer is shifted to a long wavelength side, the substance being a tackifier having a molecular weight of 100 to 5,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

14. A volume hologram laminate according to claim 13, wherein the refractive index of the substance for shifting a recorded wavelength is at least 0.06 at 25° C. higher than that of the volume hologram layer.

15. A volume hologram laminate according to claim 13, wherein the substance for shifting a recorded wavelength is at least one of aromatic compounds, rosin type tackifiers, terpene type tackifiers and synthetic resin type tackifiers.

16. A label for preparation of a volume hologram laminate having a first adhesive layer, a volume hologram layer, a second adhesive layer and a surface protecting film formed on a release liner sheet in the described order, wherein a substance with a refractive index lower than that of the volume hologram layer for shifting a recorded wavelength is contained in the first and/or the second adhesive layer(s), a reproduced wavelength of hologram recorded in the volume hologram layer is shifted to a short wavelength side, the substance being a tackifier having a molecular weight of 500 to 1,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

17. A label for preparation of a volume hologram laminate having a first adhesive layer, a volume hologram layer, a second adhesive layer and a surface protecting film formed on a release liner sheet in the described order, wherein a substance with a refractive index higher than that of the volume hologram layer for shifting a recorded wavelength is contained in the first and/or the second adhesive layer(s), a reproduced wavelength of hologram recorded in the volume hologram layer is shifted to a long wavelength side, the substance being a tackifier having a molecular weight of 100 to 5,000, neither adhesive layer contains a heat-sealing agent, and the volume hologram laminate is produced by heat-treatment of the laminate during a production process therefor thereby shifting the tackifier from the adhesive layer in which the tackifier is contained to the volume hologram layer.

* * * * *